United States Patent
Tkachenko et al.

(10) Patent No.: US 10,069,313 B2
(45) Date of Patent: Sep. 4, 2018

(54) MODULATED PULSE CHARGING AND DISCHARGING OF A RECONFIGURABLE BATTERY PACK

(71) Applicant: GBATTERIES ENERGY CANADA INC., Ottawa (CA)

(72) Inventors: Oleksandr Tkachenko, Ottawa (CA); Mykola Sherstyuk, Ottawa (CA)

(73) Assignee: GBatteries Energy Canada Inc., Ottawa (CA)

( * ) Notice: Subject to any disclaimer, the term of this patent is extended or adjusted under 35 U.S.C. 154(b) by 0 days.

(21) Appl. No.: 15/939,018

(22) Filed: Mar. 28, 2018

(65) Prior Publication Data
US 2018/0219390 A1    Aug. 2, 2018

Related U.S. Application Data

(63) Continuation-in-part of application No. 15/644,498, filed on Jul. 7, 2017.

(60) Provisional application No. 62/360,432, filed on Jul. 10, 2016.

(51) Int. Cl.
H02J 7/00    (2006.01)
H01M 10/44   (2006.01)
H01M 10/42   (2006.01)

(52) U.S. Cl.
CPC ......... *H02J 7/0024* (2013.01); *H01M 10/425* (2013.01); *H01M 10/441* (2013.01); *H02J 7/0093* (2013.01); *H01M 2010/4271* (2013.01)

(58) Field of Classification Search
CPC ........ H02J 7/0093; H02J 7/007; H02J 7/0024; H01M 10/425; H01M 10/441; H01M 2010/4271
USPC .......................................... 320/118, 139, 141
See application file for complete search history.

(56) References Cited

U.S. PATENT DOCUMENTS

| | | | | |
|---|---|---|---|---|
| 6,841,974 B2 * | 1/2005 | Dykeman | ............. | H02J 7/0093 320/141 |
| 7,622,898 B2 * | 11/2009 | Shimizu | ................ | H02J 7/0016 320/166 |
| 2017/0005497 A1 * | 1/2017 | Sherstyuk | ............. | H02J 7/0068 |

* cited by examiner

*Primary Examiner* — Nathaniel Pelton
(74) *Attorney, Agent, or Firm* — Schott, P.C.

(57) ABSTRACT

Disclosed is pulse charging and pulse discharging of a reconfigurable battery pack that uses frequency modulation to vary the pulse periods of the charging pulses and the discharging pulses. Battery measurements can be made to determine the duty cycles of the charging pulses and the discharging pulses. Additionally, the battery pack can be reconfigured to match with varying charging devices and varying loads.

23 Claims, 16 Drawing Sheets

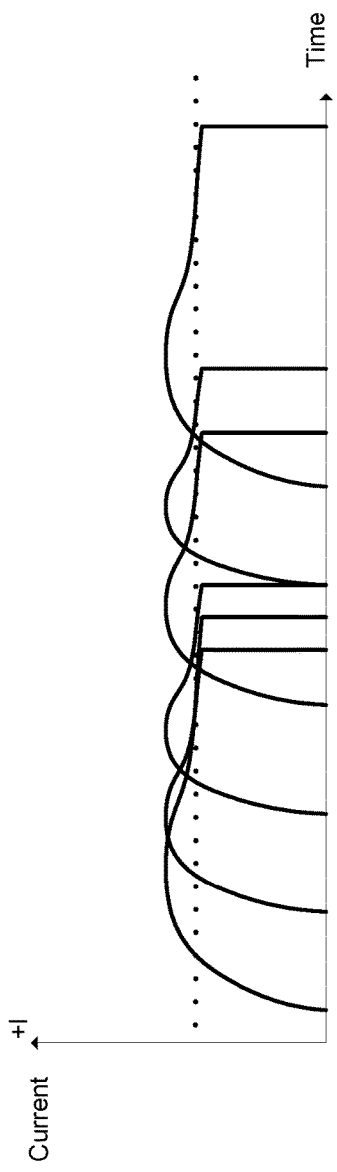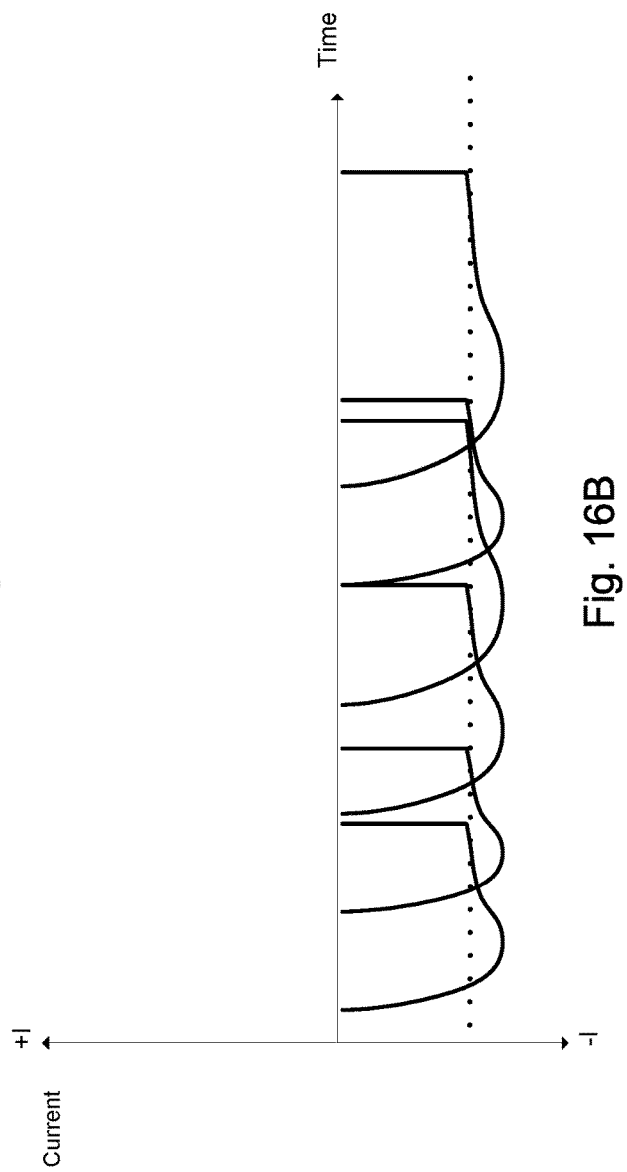

MODULATED PULSE CHARGING AND DISCHARGING OF A RECONFIGURABLE BATTERY PACK

CROSS REFERENCE TO RELATED APPLICATIONS

This application is a Continuation-in-part Application under 35 U.S.C § 120 of U.S. patent application Ser. No. 15/644,498, filed on Jul. 7, 2017 and entitled "Modulated Pulse Charging," which claims priority to U.S. Provisional Patent Application No. 62/360,432, filed on Jul. 10, 2016. The content of U.S. patent application Ser. No. 15/644,498 and U.S. Provisional Patent Application No. 62/360,432 are incorporated herein by reference in their entirety for all purposes.

This application is also related to U.S. patent application Ser. No. 14/596,400, filed on Jan. 14, 2015, and U.S. patent application Ser. No. 15/861,610, filed on Jan. 3, 2018, which are incorporated herein by reference in their entirety for all purposes.

BACKGROUND

A "battery" or battery pack may typically comprises some configuration of several battery cells. A battery cell typically includes a casing to hold the components the of the battery cell. The battery cell may include an anode (negative electrode) immersed in a suitable electrolyte. The anode may comprise any suitable compound such as porous carbon particles (e.g., graphite particles arranged into sheets), lithium metal, or a mix of activated carbon and titanium phosphate. The battery cell may further include a cathode immersed in an electrolyte. The cathode may comprise any suitable metal oxide compound such as cobalt-oxide ($CoO_2$) particles, sodium iron phosphate particles, or lithium iron phosphate particles.

A battery discharges, for example, when it is connected across a load. During discharging, ions (e.g., lithium ions or sodium ions) flow through the electrolyte from the negative electrode to the positive electrode. Electrons flow from the negative electrode to the positive electrode through the load. The ions and electrons combine at the positive electrode. When no more ions flow for the given discharge potential applied across the cell, the battery can be deemed to be fully discharged.

During charging, the ions flow from the positive electrode to the negative electrode through the electrolyte. Electrons flow through the external charger in the direction from the positive electrode to the negative electrode. The electrons and ions combine at the negative electrode and deposit there. When no more ions flow for the given charge potential applied across the cell, the battery can be deemed fully charged and ready to use.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 16A and 16B illustrate examples of flow profiles of charging current and discharging current in a battery pack respectively.

Figure 1:
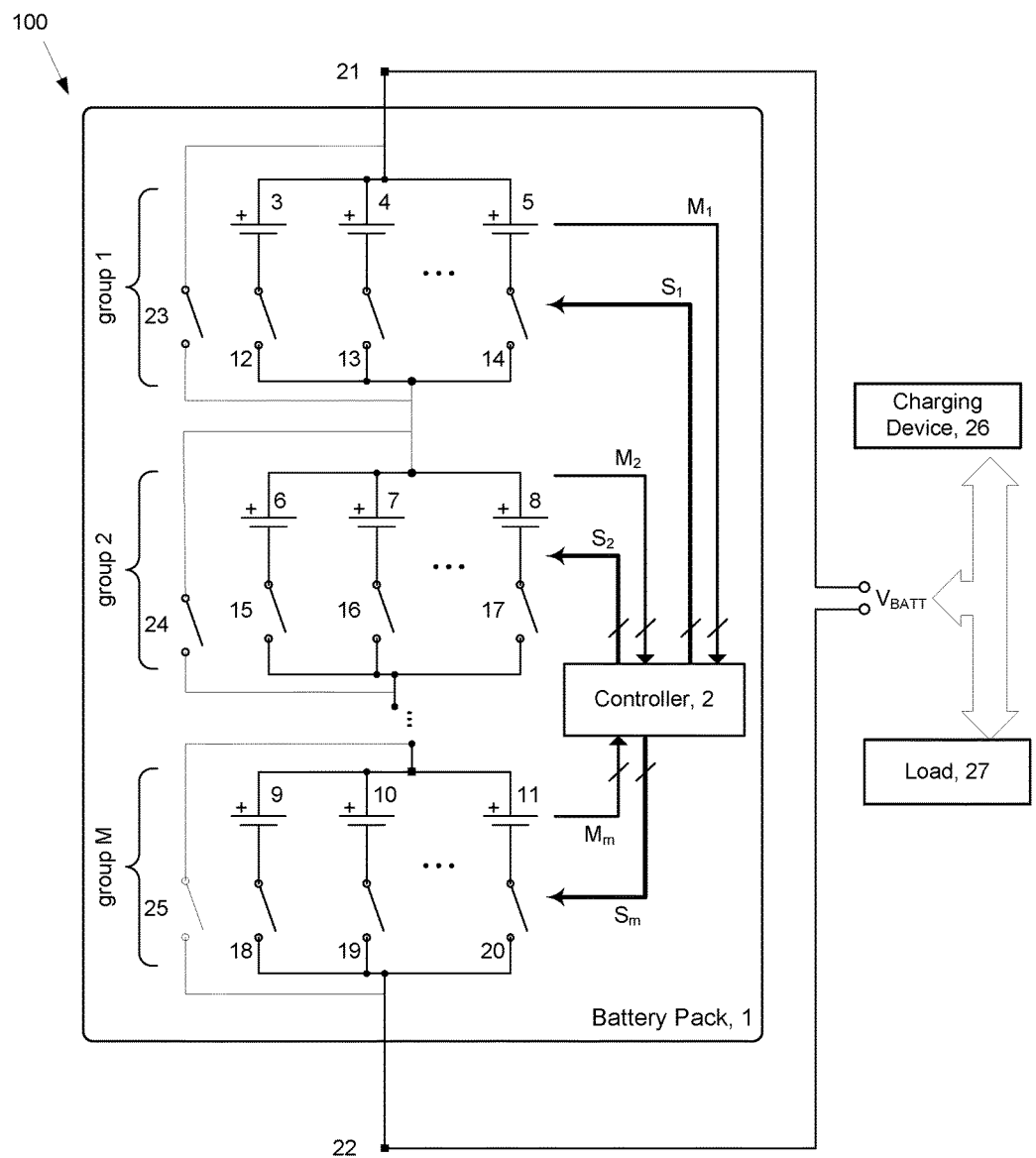
FIG. 1 shows a battery system that includes a reconfigurable battery pack in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE DISCLOSURE

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is provided to describe particular embodiments only and is not intended to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless defined otherwise, all technical and scientific terms used herein have the same meaning as commonly understood by one of ordinary skill in the art to which this invention belongs.

During a charging process of the battery cell, electric charge can build up in the battery cell. The battery cell comprises a number of mechanisms to dissipate (discharge) the accumulated charge energy. The dissipation mechanisms are substantially distributed inside the battery cell. It is believed the dissipation mechanisms transfer energy (electric charge) to drive electrochemical reactions in the material of the negative electrode, the surrounding electrolyte, and the ions to redistribute the ions in the negative electrode to the positive electrode. The stored energy can therefore be transformed into ionic storage form, such as the redistribution of ions from the negative terminal to the positive terminal.

Charge dissipation can occur at different rates. The discharge rate can be defined and affected by local levels of accumulated charge in the battery, local properties of the dissipation mechanisms, and so on. Due to such differences, the dissipation time can vary from region to region with the battery cell. These dissipation mechanisms allow for the concurrent discharge of stored energy. Thus, the longest of the dissipation times should be sufficient time for the stored energy to dissipate into chemical form. It has been observed that dissipation times are normally in the range between 0.1 µs and 100 ms.

The present disclosure presents circuits and techniques for pulse charging and pulse discharging of a battery. Pulse charging and pulse discharging in accordance with the present disclosure takes into consideration the foregoing real-time electrochemical and macrokinetic processes that occur within the battery. This includes progression of the electrode(s) material's elastic deformations and mechanical impedance changes during ion intercalation and deintercalation. Models of battery cell chemistry can be used in real-time calculations, and electric current bursts (pulses) can be controlled in real-time at microsecond scales. Further, a reconfigurable battery pack described in the present disclosure can take into consideration parameters (e.g., voltage and current specifications) of a charging device and/or a load to determine a configuration of the battery pack for getting charged and discharged in accordance with the present disclosure.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

FIG. 1 shows a battery system 100 in accordance with the present disclosure. The battery system 100 comprises a reconfigurable battery pack 1 that comprises a plurality of battery cells 3-11. Each battery cell 3-11 may be connected to a corresponding switching element 12-20 (battery switch); e.g., a field effect transistor (FET) switch. The battery cells 3-11 may be organized into M battery groups such as group 1, group 2 . . . group m. Each battery group may have N battery cells connected in parallel, for a total of M×N battery cells in the battery pack 1. In some embodiments, for example, N may be 2-100. Battery group 1, for example, comprises N battery cells 3, 4, . . . 5. Battery group 2 comprises N battery cells 6, 7, . . . 8, and so on. In some embodiments, each battery group may have the same number N of battery cells. In other embodiments, the number N of battery cells may vary from one battery group to another. The number M of battery groups can depend on the desired output voltage $V_{BATT}$ of the battery pack 1. For example, if the desired $V_{BATT}$ is 400 V and the battery cells 3-11 are 3.7 V batteries, then there will be M=108 battery groups for a $V_{BATT}$ of 399.6 V. Other configurations of M and N are possible. Further, each group of battery cells group 1, group 2 and group m is connected to a corresponding bypass switching element 23, 24, . . . 25 (e.g. and FET switch). The bypass switching element when in CLOSED state enables bypassing the corresponding group of battery cells, while the battery pack is being charged or discharged. For example, when the bypass switching element 23 is in CLOSED state, the group 1 of battery cells 3, 4, . . . 5 gets bypassed in the flow of charging current (while the battery pack 1 is being charged) and in the flow of discharging current (while the battery pack 1 is being discharged).

The battery cells 3-11 may be lithium-ion battery cells, lithium metal battery cells, sodium ion battery cells, nickel cadmium battery cells, nickel metal hydride battery cells, or lead acid battery cells. It is to be understood that the methods and systems described here are not limited by the battery types, and are applicable to all battery types.

During charging of the battery pack 1, a charger voltage from a charging device 26 gets connected to the battery pack 1 at terminals 21 and 22. Similarly during discharging, the current from the battery pack 1 flows to the load 27 via terminals 21 and 22. The charging device 26 can be any suitable power source such as, but not limited to, an AC adapter, a capacitive device, another battery, and so on. The load 27 receives current from the battery pack 1 in accordance with the present disclosure as discussed later.

The battery system 100 includes a controller 2 operatively coupled to the battery pack 1. In some embodiments, the battery pack 1 can include a controller 2. In accordance with the present disclosure, the controller 2 includes circuitry to perform measurements for each battery cell 3-11 in the battery pack 1. For example, the measurements for each battery cells 3-11 in the battery pack 1, may include, but not limited to, voltage and current measurements (such as charging current, charging voltage, discharging current, discharging voltage etc.). Battery cell measurements may be taken for each battery cell in each battery group. Each battery group may have a set of measurement lines $M_x$ that feed into the controller 2, to allow for each battery cell in that battery group to be individually measured. For example, battery group 1 may provide a set $M_1$ of measurement lines, battery group 2 may provide a set of measurement lines $M_2$, and so on. Battery cell measurements may be done at time intervals allowing to digitize precise values and dynamic changes of measured parameters for each battery cell in real time. As will be discussed below, the measurements can be used by the controller 2 to control the ON (conducting)/OFF (non-conducting) states of the switching elements 12-20.

The switching elements 12-20 of the battery pack 1 can be controlled by controller 2. The controller 2 can output control signals (switching signals) for each battery group via a set of switching lines $S_x$. For example, a set of switching lines $S_1$ provided to battery group 1 may comprise a control line for each switching element 12, 13, ... 14 and the bypass switching element 23 in battery group 1, a set of switching lines $S_2$ provided to battery group 2 may comprise a control line for each switching element 15, 16, ... 17 and the bypass switching element 24 in battery group 2, and so on. During charging of battery pack 1, each battery cell 3-11 of the battery pack 1 gets pulse charged via its corresponding switching element 12-20. In accordance with the present disclosure, the switching elements 12-20 and the bypass switching elements 23-25 of the battery pack 1 can be controlled such that the charge current from the charging device 26 flowing into the battery pack 1 through terminals 21 and 22 is substantially constant while the battery pack 1 is being charged, and the discharge current that flows from the battery pack 1 to the load 27 is substantially constant while the battery pack 1 is being discharged.

The content of commonly owned U.S. patent application Ser. No. 14/596,400 filed on Jan. 14, 2015 is incorporated herein by reference in its entirety for all purposes. In accordance with the same, the controller 2 can determine a configuration of the battery pack 1 according to one or more parameters of the charging device 26 and/or one or more parameters of the load 27. The one or more parameters of the load 27 may include voltage and current requirements requested by the load 27. The one or more parameters of charging device 26 may include voltage and current values specified for the charging device 26. Such voltage and current values may correspond to capability of the charging device. In an embodiment, the determination of a configuration of the battery pack 1 can be done according to the one or more parameters of the charging device 26, when the battery pack 1 is being charged by the charging device 26. In another embodiment, the determination of a configuration of the battery pack 1 can be done according to one or more parameters of the load 27, when the battery pack 1 is being discharged through the load 27. In another embodiment, the determination of the configuration of the battery pack 1 can be done according to both one or more parameters of the charging device 26 and the one or more parameters of the load 27.

The controller 2 is configured to detect the parameters of the charging device 26 and the load 27. In an exemplary embodiment, the controller 2 can receive communications about the respective parameters from the charging device 26 and the load 27 through two-way or one-way communication links (not shown in FIG. 1).

In some embodiments, the determination of the configuration of the battery pack 1 can be done based on health of the battery cells 3-11. The health of any battery cell includes, but not limited to internal impedance, level of electrolyte decomposition, state of interphase between current collector and active material, and thickness of solid electrolyte interphase (SEI) layer. The controller 2 can determine the respective health of the battery cells 3-11 and, based on the determined respective health, determined parameters of the charging device 26, and/or determined parameters of the load 27, the controller can determine the configuration of the battery pack 1 for charging and/or discharging.

In accordance with the present disclosure, the determination of the configuration of the battery pack 1 by the controller 2 includes selection of battery cell(s) or selection of group(s) of battery cells that need to be charged and/or discharged, and accordingly determination of the respective state (OPEN or CLOSED) of the switching elements 12-20 and bypass switching elements 23-25. In some embodiments, the controller 2 can determine a time period for which the one or battery cells and/or the one or more battery cells are to be connected to the charging device 26 (for charging) and/or to be connected to the load 27 (for discharging) while determining a configuration of the battery pack 1. In some embodiments, the controller 2 can select the battery cell(s) or group of battery cells and the determine the time period based on age of the one or more battery cells, current state of the one or more battery cells, and health of the one or more battery cells.

In some embodiments, the controller 2 can determine a configuration schedule based on the detected one or more parameters of the charging device 26 and/or the detected one or more parameters of the load 27. A configuration schedule comprises a sequence of one or more entries, each entry including a time and a battery system configuration. An exemplary configuration schedule may be [t1, configuration 1], [t2, configuration 2], [t3, configuration 3]. Such configuration schedule defines defined different configurations (configuration 1, configuration 2, configuration 3) in which the one or more battery cells are to be connected to the charging device or load for different time periods (t1, t2, t3).

In an exemplary embodiment, each battery cell 3-11 of the battery pack 1, provides a nominal voltage of 3.7 V under the load of 1 A. The cell voltage ranges from 2.5V to 4.0V under this load. The load 27 may be exemplarily, a variable-speed electric motor coupled to the battery pack 1 via a variable voltage inverter. The variable voltage inverter provides the variable voltage necessary for variable speed control of the motor. As the inverter's efficiency is best when the input to output voltage ratio is at a minimum, it would be beneficial if the battery pack 1 provides a variable voltage to the input of the inverter. Such variable voltage output of the battery pack 1 is achieved by a dynamic regrouping of the system's battery cells, facilitated by signaling between a load controller (not shown in FIG. 1) associated with the load 27 and the controller 2 via a communication channel (which may be one-way or two-way communication). For example, if the load controller requests that 3.7 V, 1 A power is provided to the inverter, the controller 2 may connect, one at a time, each of the battery cells 3-11 of the battery pack to the load 27. The controller 2 may CLOSE the switching element associated with the battery cell, for the time period the battery cell is to be connected to the load 27. Additionally, the controller 2 may determine states for other switching elements and bypass switching elements to maintain a continuous path for the discharge current to flow from the battery pack 1 to the load 27. This connection scheme provides the longest relaxation time for each battery cell and is the most efficient for the cell's discharge. Each battery cell participating in this mode may be connected to the load 27 for time durations that are chosen based on cell's age, current state of charge, and health. When the load controller requests an increase in output current with still the same output voltage, the battery cells may still be connected to the load 27 in rotation, but in some cases connected as parallel groups to facilitate the higher current. Decision of how many and which battery cells to be connected in parallel while delivering energy to the load 27 is made by the controller 2. Such decision may also be based on health and type of the battery cells 3-11.

If the load controller requests an increase of the voltage delivered to the motor from 3.7V to 7.4V, the controller 2 may select battery cells in such a way that the load 27 is connected to at least two battery cells connected in series at any instant in time. Battery cells deliver power to the load in such a series-formation for an assigned duration of time. Such a time assignment may be necessary to accommodate battery cell balancing and to prevent some cells from being discharged earlier than others. In some cases such battery formations are done as combination of serial and parallel connections. For example a group of two weaker battery cells connected in parallel is connected in series with another stronger cell. Other formations may also be contemplated. In some cases longer chains of multiple parallel connected cell groups are formed. Other combinations are also possible. If the maximum voltage of 37V is requested by the load controller, 10 battery cells may be connected to the load 27 in series. In case of one or several battery cells reaching their discharge limits, such battery cells would be eliminated from group formations in some modes. It is beneficial to give some weaker battery cells extended relaxation time periods while still using other cells of the system. After extended relaxation such weaker cells will be still discharged for some additional time. In some cases such weaker cells will be included into power delivery formations only in cases when the individual current for each participating cell and duration of time under such load current are below a calculated threshold.

While the above embodiments described how the battery pack 1 may be reconfigured as per communications received from the load controller, the load controller may also reconfigure its load conditions based on communication from the controller 2. For example, the load controller will choose the motor speed variations based on controller 2 reports about remaining system capacity in each possible power delivery mode. In case of five battery cells having 30% remaining capacity and six remaining other cells having 10% remaining capacity (despite of all efforts to balance the overall battery cell discharge), the load controller may limit motor speed modes to those allowing the appropriate/optimal usage of all energy stored in the battery pack 1. The controller 2 reporting the overall battery cell health state allows the load controller to optimize the motor speed variations and select such speeds which are acceptable by the controller 2 to build battery formations for the load 27. The user might be given estimated load performance modes and time of use based on the controller 2 reports. In this case user might choose performance over longer drive time, or vice versa, for example.

Usage of such dynamically reconfigurable battery pack 1 with a variable load is not limited to the exemplary embodiment only. Another exemplary application of a reconfigurable battery system is in storage of solar and wind energy. Solar and wind energy systems provide variable amount of electricity at any given instant of time, on account of its dependency on the variable weather conditions. The battery system's health and thus, its calendar life can be enhanced if it is able to dynamically reconfigure according to real time requirements of the renewable energy source (and any external load that may eventually draw power from the battery system).

Communication between controllers of the energy source and the battery system would allow the battery pack 1 to re-configure in such a way that the battery pack 1 will provide the maximum possible storage capacity for the longest calendar life, as well as cycle life. When the energy source controller (for example charging device 26) reports that it can provide a higher voltage, the controller 2 configures the battery pack 1 accordingly in order to match (e.g. in real-time) the battery cell formation voltage and the charging current capacity with the output level of the energy source (charging device 26). In the case of a simplified, controller-less energy source, the controller 2 may identify the necessary configuration of the battery pack 1 based on obtained measurements on the energy source output. This matching of the battery pack 1 with the energy source output (charging device 26) results in better efficiency. In an exemplary embodiment, the controller 2 may detect current and/or voltage specifications of the charging device 26 and accordingly re-configure the battery pack 1 for charging of the battery pack 1. The re-configuration of the battery pack includes selection of battery cell(s) or selection of group(s) of battery cells that need to be charged by the charging device 26, and accordingly determine the respective state (OPEN or CLOSED) of the switching elements 12-20 and bypass switching elements 23-25.

In an exemplary embodiment, by virtue of being reconfigurable, the battery pack 1 can receive charge from any charging device in the range of 4.2 V-42 V. If the charging device 26 is capable of providing charge having specifications of 9 volt (V) 2 amp (A), the controller 2 can reconfigure the battery pack 1 to match the specifications of the charging device 26. For example, the battery pack 1 can be reconfigured to receive charge of 9 volts. For such reconfiguration, the battery pack 1 can form 2 cell deep stack.

In some of the embodiments, the controller 2 may facilitate exchange of short pulses among some of the one or more battery cells. This exchange of short pulses may occur when the one or more battery cells are idle (neither being charged or discharged), the one or more battery cells are being charged, or the one or more battery cells are being discharged. The one or more battery cell can be idle even when the battery pack 1 is being charged or discharged, but the one or more battery cells are not selected at that point in time to be charged or discharged. The exchange of short pulses among some of the one or more battery cells may be bidirectional, and the short pulses that are exchanged can by symmetrical or asymmetrical. Such exchange of short pulses between any two battery cells may not have net effect on state of charge (SOC) of the battery cells. However, such exchange of short pulses mitigates dendrite formation in the battery cells, and thus facilitates maintenance of stable solid electrolyte interphase (SEI) layer in the battery cells, specifically in case of lithium metal battery cells.

Upon re-configuring the battery pack 1 for charging or discharging as per the determined configuration or determined configuration schedule, the controller 2 controls charging or discharging of the one or more battery cells in accordance with the modulated pulse charging or modulated pulse discharging, as described below.

Figure 2:
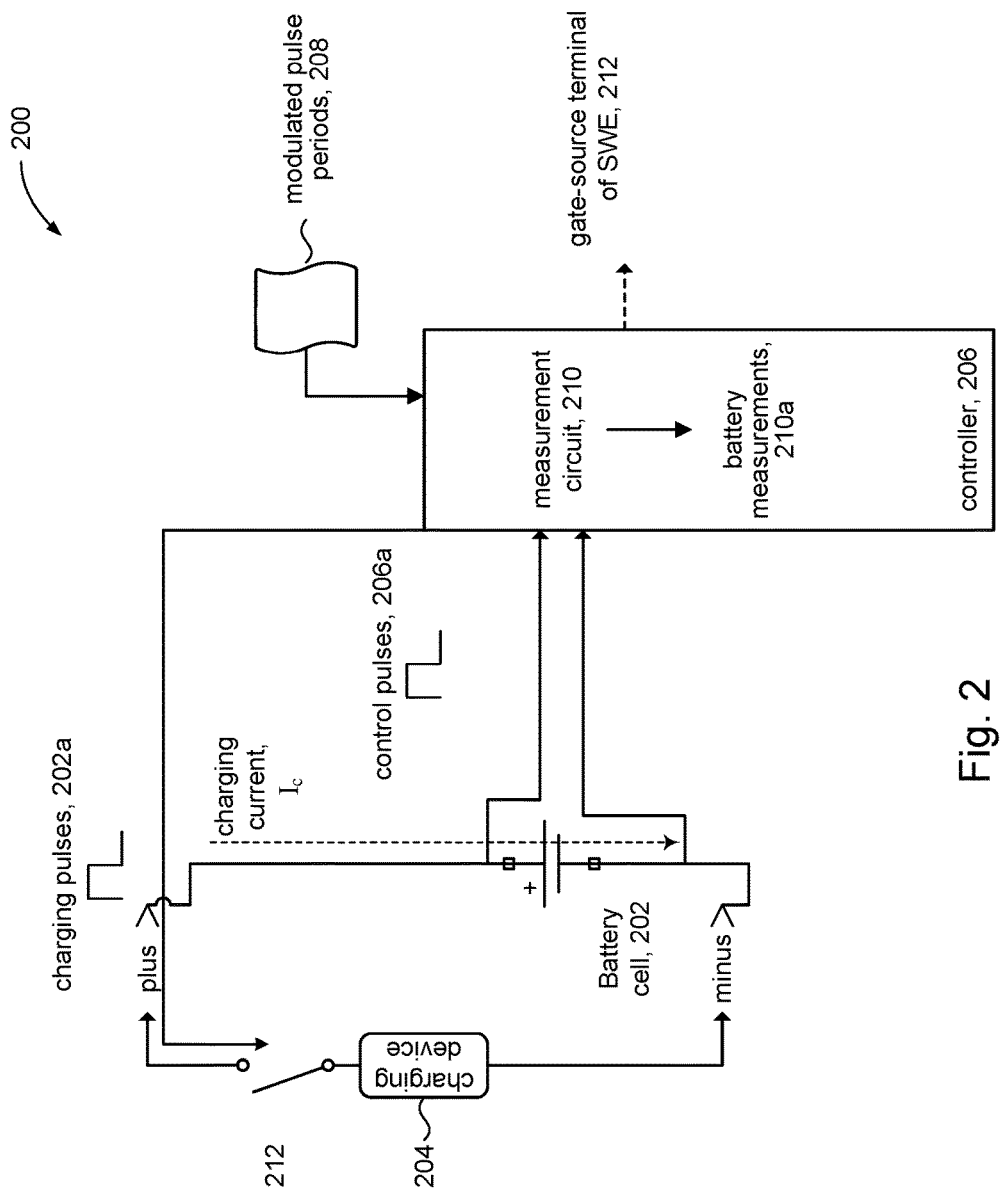
FIG. 2 illustrates pulse charging of a battery cell in accordance with the present disclosure.

Referring now to FIG. 2, the modulated pulse charging has been depicted and discussed for a single battery cell. However, such techniques of modulated pulse charging are applicable to all battery cells 3-11 of the battery pack 1, and to the battery pack 1 as whole.

In accordance with the current disclosure, a controller 206 (equivalent to controller 2 of FIG. 1) of a charging circuitry 200 may provide charging current from a charging device 204 (equivalent to charging device 26) to a battery cell 102 (can be any battery cell among battery cells 3-11 of FIG. 1). The controller 206 may generate control pulses 206a that are provided to the switching element 212 (equivalent to switching element 12-20 of FIG. 1) to produce the charging pulses 202ia for the battery cell 202. In accordance with the present disclosure, the controller 206 can modulate the frequency (e.g., pulse period) of the control pulses 206a, and hence the charging pulses 202a. For example, the controller 206 can control the duration of the ON period and the OFF period of each control pulse 206a, and of each charging pulse 202a.

In some embodiments, the controller 206 can use a lookup table that defines a set of modulated pulse periods. In other embodiments, the controller 206 can modulate the pulse periods of the control pulses 206a by computing the pulse periods on the fly; e.g., using a mathematical function. The amplitudes of the control pulses 206a are logic levels, and can vary between logic LO (e.g., $V_{SS}$, such a ground potential) to logic HI (e.g. $V_{DD}$ such as 5V).

As discussed above for FIG. 1, the controller 2 measures the flow of energy (e.g., electrical current) through each of the plurality of battery cells 3-11 during charging and discharging through measurement lines $M_x$. Similarly, the battery measurements 210a produced by measurement circuit 210 of the controller 206 can be used to generate control pulses 206a.

Figure 3:
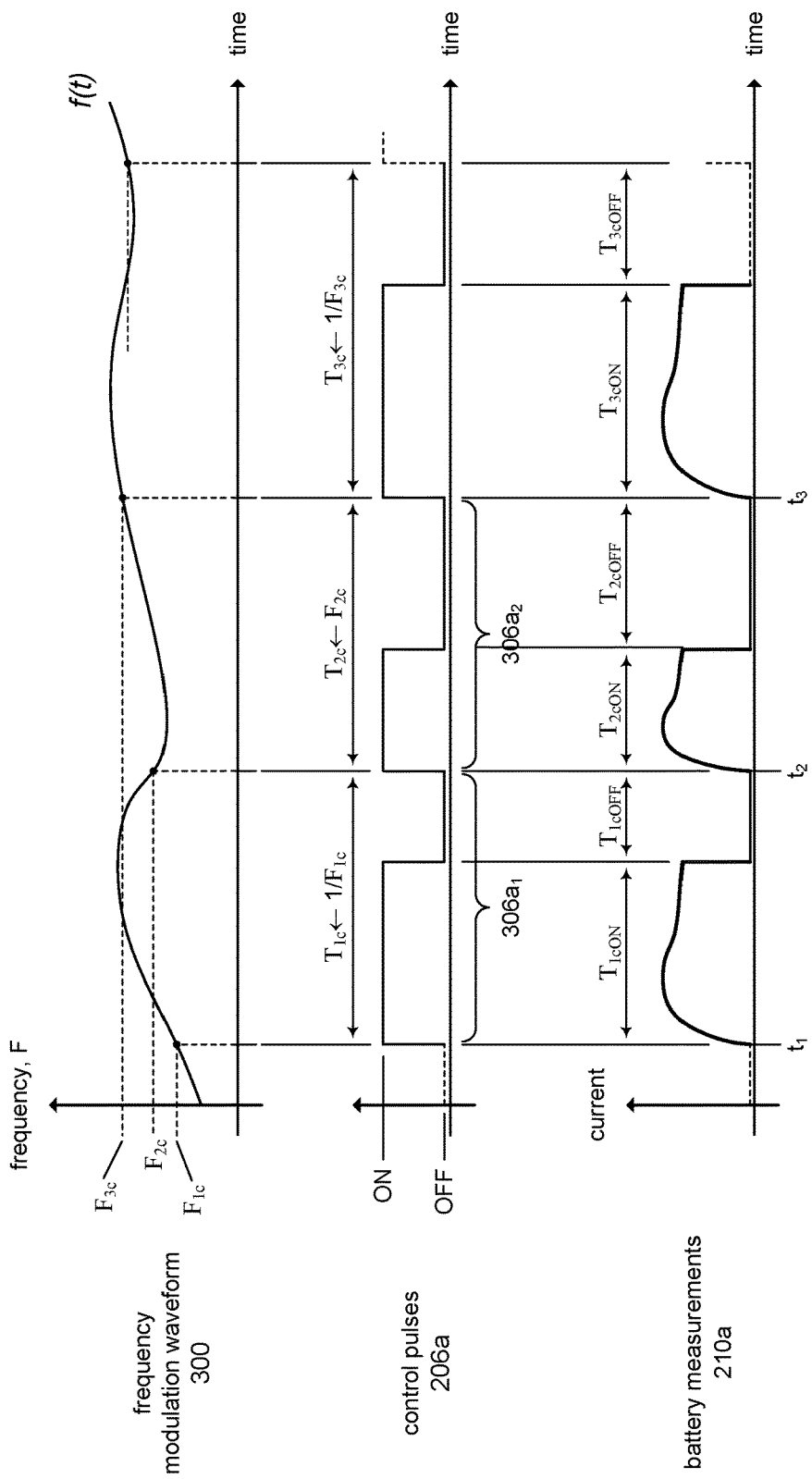
FIG. 3 shows waveforms for pulse charging in accordance with the present disclosure.

FIG. 3 shows a modulation waveform 300 that is used to specify pulse periods that can be identified, or otherwise associated, with control pulses 206a (and hence the charging pulse 202a). In some embodiments, the modulation waveform 300 can be expressed as change in frequency vs. time, as shown in the figure. In other embodiments, the modulation waveform 300 can be expressed as change in pulse period vs. time. Thus, with respect to the frequency vs. time waveform in FIG. 3, for a given frequency f taken at time t, the pulse period can be computed by its reciprocal, namely 1/f.

In accordance with the present disclosure, the modulation waveform 300 can be used to select a pulse period (vis-à-vis its frequency) for each of the control pulses 206a based on the timing of the control pulse and, hence for each of the charging pulses 202a. Thus, for example, a control pulse $306a_1$ that begins at time $t_1$ will be associated with a pulse period ($T_{1c}$) based on a frequency ($F_{1c}$) on the modulation waveform 300 at time $t_1$. Likewise, a control pulse $306a_2$ at time $t_2$ will be associated with a pulse period ($T_{2c}$) based on a frequency ($F_{2c}$) taken off the modulation waveform 300 at time $t_2$, and so on. Furthermore, in accordance with the present disclosure, each control pulse (e.g., $306a_1$) is "associated" with its respective pulse period ($T_{1c}$) in the sense that the actual pulse period can be different from its associated pulse period. This aspect of the present disclosure is discussed below.

FIG. 3 also shows diagrammatic examples of battery measurements 210a taken by the controller 206 for battery cell 202. In some embodiments, the battery measurements 210a can be expressed in terms of charging current flow through the battery cell 202 as a function of time. For the battery cell 202, as the FIG. 3 shows, the battery measurements 210a exhibit a response profile during the ON periods ($T_{1cON}$, $T_{2cON}$, etc.) of the control pulses 206a when current is being supplied to the battery cell by the charging pulses 202a (FIG. 2). In accordance with the present disclosure, the duty cycle of each control pulse 206a can be determined based on the battery measurements 210a. The duty cycle of a pulse is typically computed as the ratio of the ON period of the pulse to the total period of the pulse; e.g., the duty cycle of pulse $306a_1$ can be computed as the ratio $T_{1cON}/(T_{1cON}+T_{1cOFF})$.

The waveform shown in FIG. 3 shows that the modulation waveform 300 can be any arbitrary waveform. As FIG. 3 indicates, in some embodiments, the modulation waveform 300 can be a continuous function and computed on the fly. In other embodiments, the modulation waveform 300 can comprise data points in a lookup table.

Figure 4:
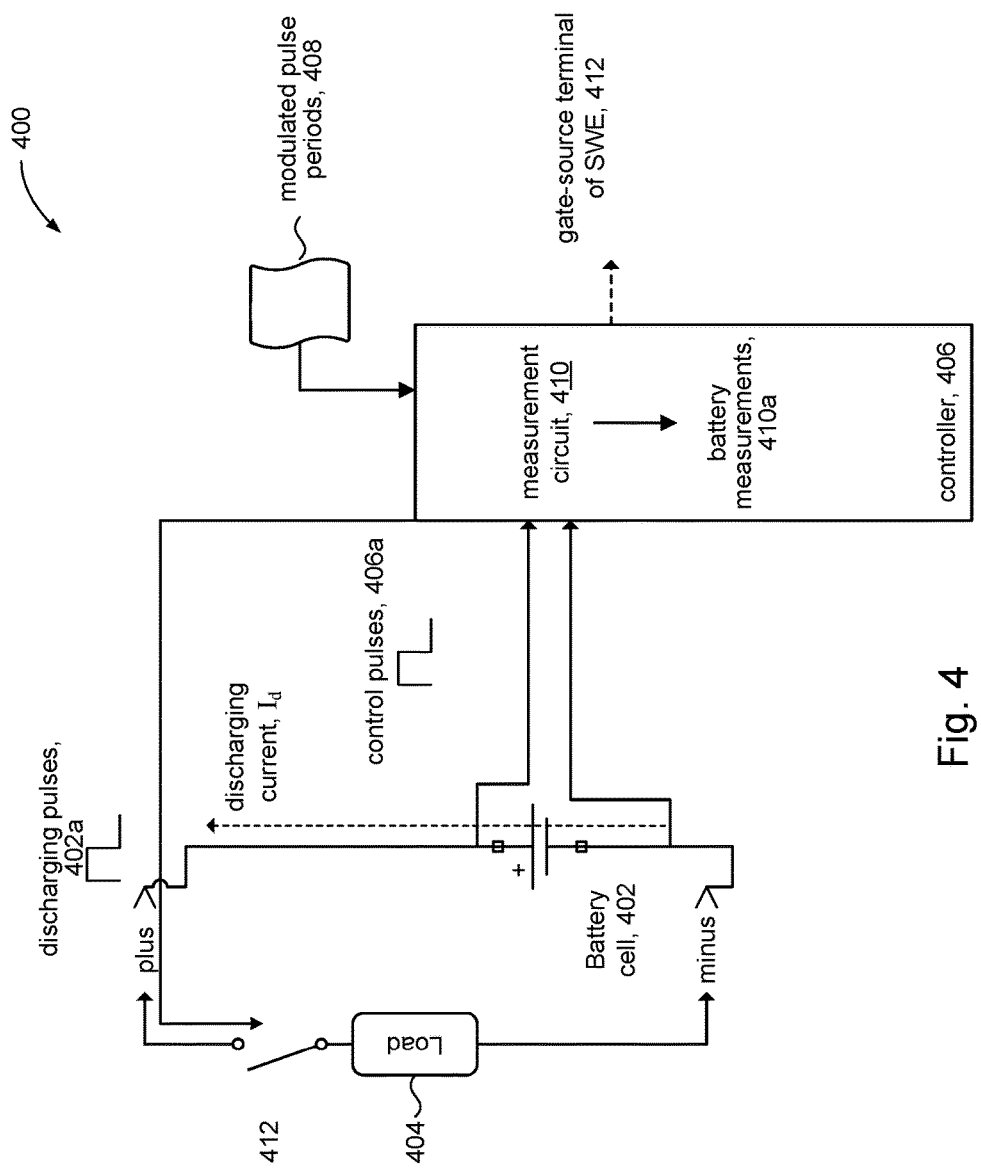
FIG. 4 illustrates pulse discharging of a battery cell in accordance with the present disclosure.

Referring now to FIG. 4 the modulated pulse discharging has been depicted and discussed for a single battery cell. However, such techniques of modulated pulse discharging are applicable to all battery cells 3-11 of the battery pack 1, and to the battery pack 1 as whole.

In accordance with the current disclosure, a controller 406 (equivalent to controller 2 of FIG. 1) of a discharging circuitry 400 may provide discharging current from a battery cell 402 (can be any battery cell among battery cells 3-11 of FIG. 1) to a load 404 (equivalent to load 27 of FIG. 1). The controller 406 may generate control pulses 406a that are provided to the switching element 412 (equivalent to switching element 12-20 of FIG. 1) to produce the discharging pulses 402a for the battery cell 402. In accordance with the present disclosure, the controller 406 can modulate the frequency (e.g., pulse period) of the control pulses 406a, and hence the discharging pulses 402a. For example, the controller 406 can control the duration of the ON period and the OFF period of each control pulse 406a, and of each discharging pulses 402a.

In some embodiments, the controller 406 can use a lookup table that defines a set of modulated pulse periods. In other embodiments, the controller 406 can modulate the pulse periods of the control pulses 406a by computing the pulse periods on the fly; e.g., using a mathematical function. The amplitudes of the control pulses 406a are logic levels, and can vary between logic LO (e.g., $V_{SS}$, such a ground potential) to logic HI (e.g. $V_{DD}$ such as 5V).

As discussed above for FIG. 1, the controller 2 measures the flow of energy (e.g., electrical current) through each of the plurality of battery cells 3-11 during charging and discharging through measurement lines Mx. Similarly, the battery measurements 410a produced by measurement circuit 410 of the controller 206 can be used to generate control pulses 406a.

Figure 5:
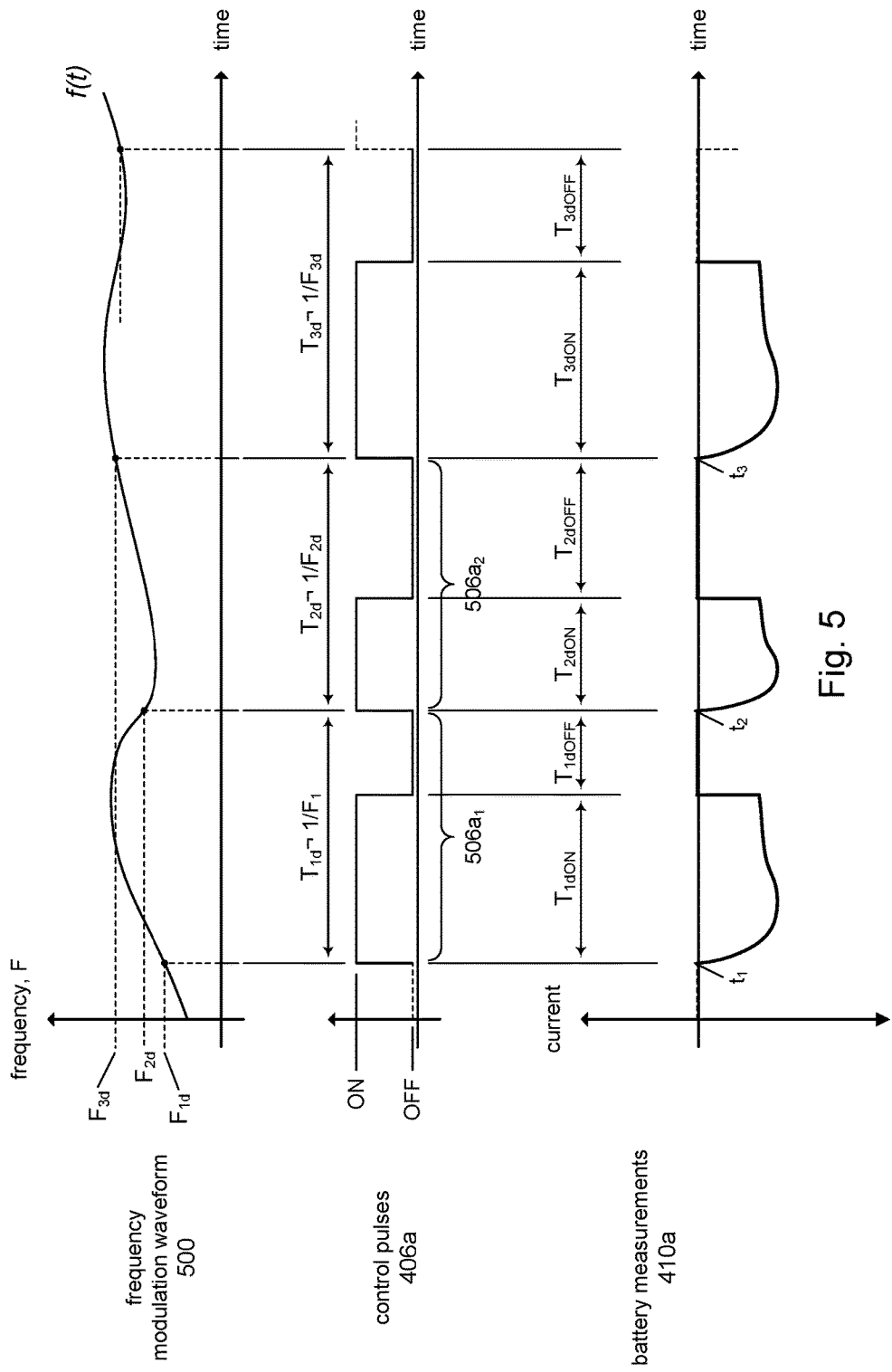
FIG. 5 shows waveforms for pulse discharging in accordance with the present disclosure.

FIG. 5 shows a modulation waveform 500 that is used to specify pulse periods that can be identified, or otherwise associated, with control pulses 406a (and hence the discharging pulse 402a). In some embodiments, the modulation waveform 500 can be expressed as change in frequency vs. time, as shown in the figure. In other embodiments, the modulation waveform 500 can be expressed as change in pulse period vs. time. Thus, with respect to the frequency vs. time waveform in FIG. 5, for a given frequency f taken at time t, the pulse period can be computed by its reciprocal, namely 1/f.

In accordance with the present disclosure, the modulation waveform 500 can be used to select a pulse period (vis-à-vis its frequency) for each of the control pulses 406a based on the timing of the control pulse, and hence for each of the discharging pulses 402a. Thus, for example, a control pulse $506a_1$ that begins at time $t_1$ will be associated with a pulse period ($T_{1d}$) based on a frequency ($F_{1d}$) on the modulation waveform 500 at time $t_1$. Likewise, a control pulse $506a_2$ at time $t_2$ will be associated with a pulse period ($T_{2d}$) based on a frequency ($F_{2d}$) taken off the modulation waveform 500 at time $t_2$, and so on. Furthermore, in accordance with the present disclosure, each control pulse (e.g., $506a_1$) is "associated" with its respective pulse period ($T_{1d}$) in the sense that the actual pulse period can be different from its associated pulse period. This aspect of the present disclosure is discussed below.

FIG. 5 also shows diagrammatic examples of battery measurements 410a taken by the controller 406 for battery cell 402. In some embodiments, the battery measurements 410a can be expressed in terms of discharging current flow through the battery cell 402 as a function of time. For the battery cell 402, as the FIG. 4 shows, the battery measurements 410a exhibit a response profile during the ON periods ($T_{1dON}$, $T_{2dON}$, etc.) of the control pulses 406a when current is being supplied from the battery cell by the discharging pulses 402a (FIG. 4). In accordance with the present disclosure, the duty cycle of each control pulse 406a can be determined based on the battery measurements 410a. The duty cycle of a pulse is typically computed as the ratio of the ON period of the pulse to the total period of the pulse; e.g., the duty cycle of pulse $506a_1$ can be computed as the ratio $T_{1dON}/(T_{1dON}+T_{1dOFF})$.

The waveform shown in FIG. 5 shows that the modulation waveform 500 can be any arbitrary waveform. As FIG. 4 indicates, in some embodiments, the modulation waveform 500 can be a continuous function and computed on the fly. In other embodiments, the modulation waveform 500 can comprise data points in a lookup table.

Figure 6A:
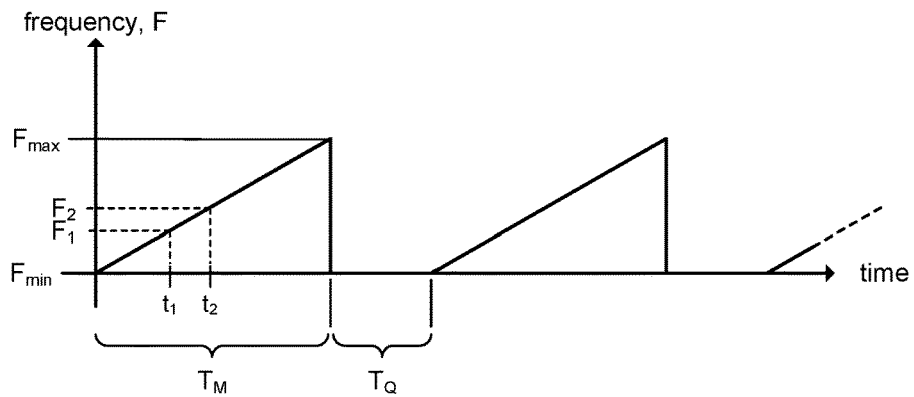
FIGS. 6A, 6B, and 6C illustrate examples of frequency modulation waveforms.
Figure 6B:
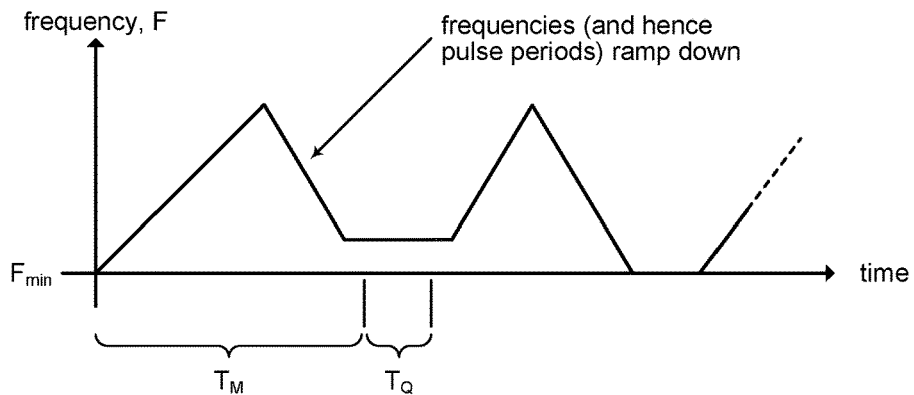
Figure 6C:
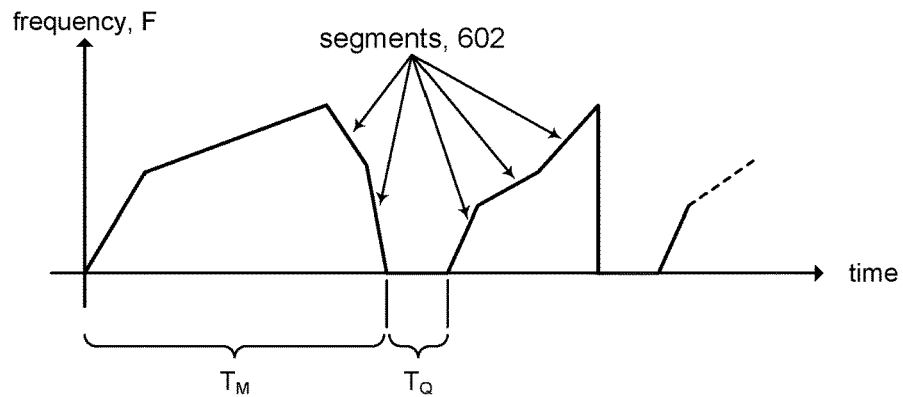

Refer now to FIGS. 6A, 6B, 6C for additional examples of frequency modulation waveforms, in accordance with various embodiments of the present disclosure, used to generate pulse periods for the control pulses 206a (and hence for the charging pulse 202a) and for the control pulses 406a (and hence for the discharging pulses 206a). FIG. 6A shows an example of a saw tooth type modulation waveform. The modulation waveform can comprise alternating modulation periods $T_M$ and quiescent periods $T_Q$. In various embodiments, the modulation period $T_M$ can be on the order of several seconds to tens of seconds. In various embodiments, the quiescent period $T_Q$ can be on the order of one to several seconds.

During a modulation period $T_M$, the selected frequency (and hence pulse period) can vary with time; the example shown in FIG. 6A, for example, shows that the pulse period can vary from $1/F_{max}$ to $1/F_{min}$.

In some embodiments, the variation in pulse periods can be linear as shown in the figure, and in other embodiments, the variation in pulse periods can be other than linear. During a quiescent period $T_Q$, the pulse periods can remain constant, or in some embodiments the controller can terminate pulse charging or pulse discharging during a quiescent period $T_Q$. The modulation periods $T_M$ can vary in duration, and likewise the quiescent periods $T_Q$ can vary in duration.

FIG. 6B shows that the pulse period can be other than a $1/F_{min}$ in a given quiescent period $T_Q$. The figure further illustrates that the modulation waveform can include portions that ramp down the pulse period as well as ramping up the pulse period.

FIG. 6C shows that a modulation waveform can comprise several segments 602.

Figure 7:
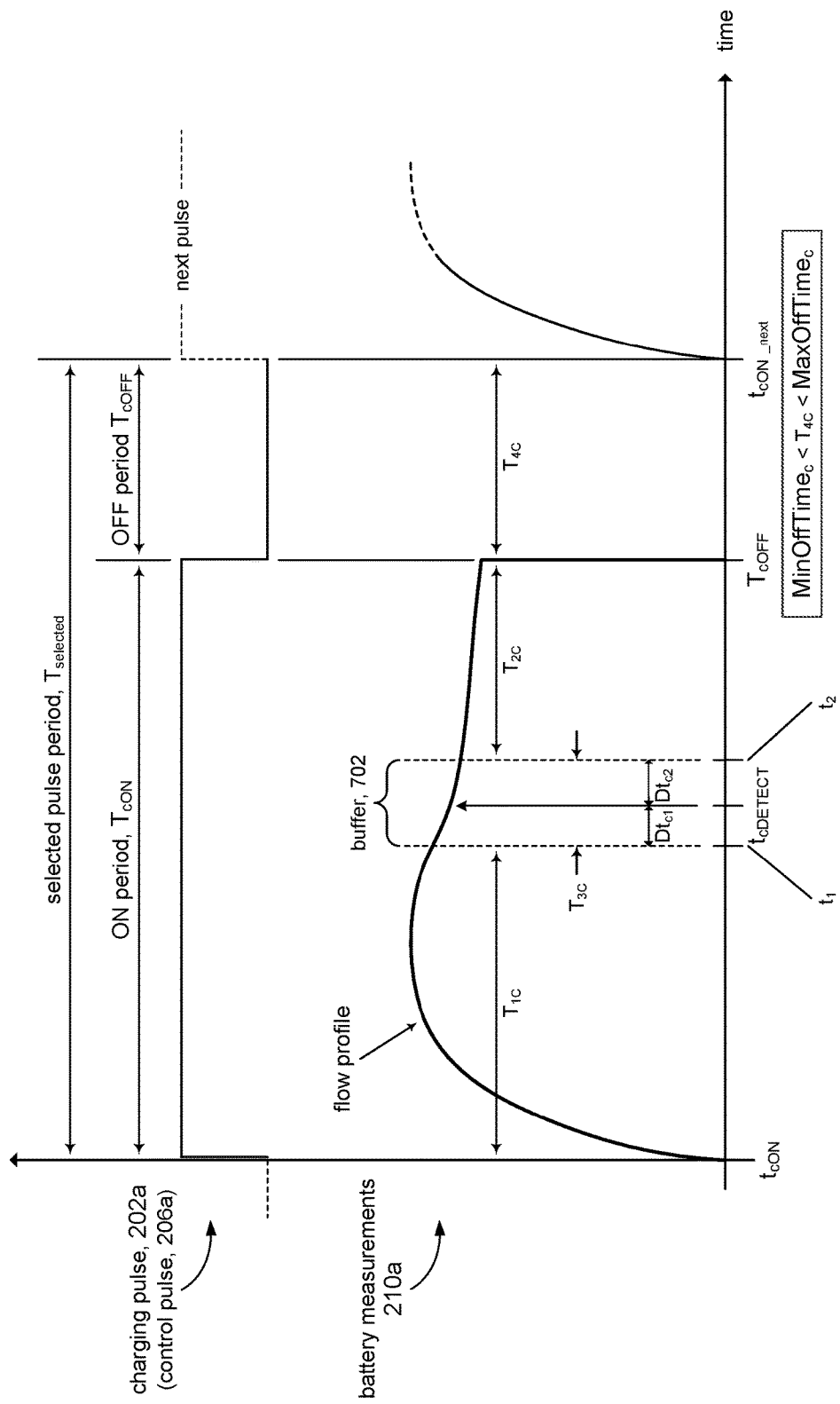
FIG. 7 illustrates details for determining the duty cycle of a charging pulse in accordance with the present disclosure.

Referring now to FIG. 7, the controller 206, in accordance with the present disclosure, can use the battery measurements 210a taken during the time of a charging pulse 202a to determine its duty cycle for each of the plurality of battery cells. Assume for discussion purposes the selected pulse period for charging pulse 202a is $T_{cselected}$; e.g., selected from a modulated waveform such as shown FIGS. 6A-6C at a time $t_{cON}$. The charging pulse 202a has an ON period ($T_{ON}$) and an OFF period ($T_{OFF}$). The duration of $T_{ON}$ and $T_{OFF}$ of the charging pulse can be dynamically determined based on battery measurements 210a made during the ON period of the charging pulse 202a.

The battery measurements 210a can comprise measurements of current flow through the battery cell 202. Current flow through the battery cell 202, can gradually increase from the time $t_{cON}$ that the charging pulse 202a is applied and follow the flow profile such as shown in FIG. 7. The flow profile of current through the battery cell 202 depends factors such as battery chemistry, state of charge, temperature, and the like. In a lithium ion battery, for example, during charging the lithium ions flow from the positive electrode to the negative electrode through the electrolyte. The electrons and lithium ions combine at the negative electrode and deposit there. During a charging pulse, the charge current saturation can occur where additional charge current into the battery cell 202 for that charging pulse 202a may not be effective and may even be detrimental (e.g., cause heat buildup, create mechanical stress).

In accordance with the present disclosure, the controller 206 can analyze or otherwise track the current flow to detect the onset charge current saturation by looking for a change in the flow profile. Suppose at time $t_{cDETECT}$ the controller 202 detects such a change in the flow profile. The time of detection $t_{cDETECT}$ can be used to determine the duration $T_{ON}$ of the ON period of the charging pulse 202a, for example, in order to limit the charge current into the battery cell 202. A first time period $T_{1C}$ between $t_{cON}$ and $t_{cDETECT}$ can be computed by backing off a margin of time $\Delta t_{1c}$ from $T_{DETECT}$, for example, by computing $t1_c = t_{cDETECT} - \Delta t_{1c}$. A buffer 702 (buffer period) comprising the margin of time $\Delta t_{1c}$ and $\Delta t_{2c}$ can be provide around the detection time $t_{cDETECT}$ to account for uncertainty in the detection of the onset of charge saturation. The first period $T_{1C}$ can be the period between time $t_{cON}$ and time $t_{1c}$.

A second time period $T_{2C}$ can be computed based on keeping the second time period within a predetermined range. During the second time period $T_{2C}$, charge saturation can be a dominant factor during the charging pulse. In some embodiments, the second time period $T_{2C}$ can be determined in order to maintain a certain ratio R between $T_{1C}$ and $T_{2C}$. For example, $T_{2C}$ can be computed from the relation: $R = T_{1C}/T_{2C}$, where R can be a predetermined ratio. The ON period $T_{cON}$ can be computed as $T_{cON} = (T_{1C} + T_{2C} + T_{3C})$, where $T_{3C}$ is the width of the buffer 702. By dynamically computing the ON period for each charging pulse 202a, battery charging can be more efficient, battery damage that inherently arises during charging (e.g., heat buildup) can be reduced (which can contribute to safety), and battery life can be extended.

In accordance with the present disclosure, the OFF period $T_{cOFF}$ of the charging pulse 202a can be computed by subtracting the $T_{cON}$ from the selected pulse period $T_{cselected}$. Thus, the OFF period $T_{cOFF}$ of the charging pulse 202a can be computed by computing the difference between $T_{cON}$ and the selected pulse period $T_{cselected}$. However, if the resulting OFF period $T_{cOFF}$ is too long, then overall battery charging time can be increased, which is typically undesirable. Accordingly, in accordance with the present disclosure if the $T_{cOFF}$ exceeds a predetermined maximum time MaxOffTime$_c$, $T_{OFF}$ can be set to MaxOffTime$_c$. Hence, the OFF period $T_{cOFF}$ of the charging pulse can be computed by selecting the lesser of: (i) a maximum period of time MaxOffTime$_c$, and (ii) the difference between the pulse period and the ON period $T_{cON}$ of the charging pulse for the battery cell. As a consequence, the actual pulse period of the charging pulse 202a will be different from the selected pulse period $T_{cselected}$.

If, on the other hand, the resulting OFF period is too short, then there may not be enough recovery time for various chemical reactions in the battery cell 202 to run their course before the onset of the next charging pulse; more time may be needed. Accordingly, in accordance with the present disclosure, if the $T_{cOFF}$ becomes less than a predetermined minimum time MinOffTime$_c$, T$_{OFF}$ can be set to MinOff-Time$_c$ to allow time for the chemical reactions to take place before initiating the next charging pulse. Hence, the OFF period T$_{cOFF}$ of the charging pulse can be computed by selecting the greater of: (i) a minimum period of time, and (ii) the difference between the pulse period and the ON period T$_{cON}$ of the charging pulse for the battery cell. As a consequence, the actual pulse period of the charging pulse 202a will be different from the selected pulse period T$_{cselected}$.

The amplitude of the charging current I$_c$ (FIG. 2) of the charging pulse can vary from one charging pulse to the next, during the charging process. The inventors of the present disclosure have noted that the OFF period of one charging pulse can affect the charging current amplitude. Accordingly, in some embodiments, rather than basing the OFF period on the selected pulse period T$_{cselected}$, the OFF period can be varied between MinOffTime$_c$ and MaxOffTime$_c$ in response to the amplitude of the charging current I$_c$.

In some embodiments, the output voltage of the charging device 204 can be selected for different charging pulses 202a. A reason for doing this is to limit the "headroom" for the current of the charging pulse 202a. The battery impedance can be a highly dynamic parameter whose value can change very quickly. It can be impractical, and in some cases may not be feasible, to use a conventional feedback loop to control the charging current to accommodate for a changing battery impedance. In accordance with some aspects of the present disclosure, the output voltage of the charging device 204 can be adjusted to limit its output level so that the current flow (i.e., charging current I$_c$, FIG. 2) into the battery cell 202 does not exceed safety levels. For example, suppose the safety limit sets a peak charging current of the battery cell 202 to be 35 A. If we expect the battery cell 202 to have a minimum battery impedance of 100 mΩ and an open circuit voltage (OCV) of 3.5 V, this establishes a 7V output voltage for the charging device 204: 3.5V+35 A×0.1Ω=7V. In other embodiments, instead of limiting the output voltage of the charging device 204, the switching element 212 can be used to limit the flow of charging current I$_c$ into battery cell 202. Referring to FIG. 2, for example, the controller 206 can produce an analog output to adjust the gate-source voltage of the switching element 212 and hence the device channel saturation of the switching element 212, to control the charging current I$_c$.

The battery cell impedance can change dynamically from one charging pulse to another. For a given charging pulse, the battery impedance can be at some initial value at the beginning of the charging pulse and at some higher value at the end of the charging pulse. The impedance change during the pulse period can be non-linear in time. The lowest and highest values of the battery cell impedance during a given charging pulse can vary during the charging process. These impedance changes can be predicted based on impedance values previously recorded during other charges of the battery or based on a mathematical model of the battery.

Figure 8:
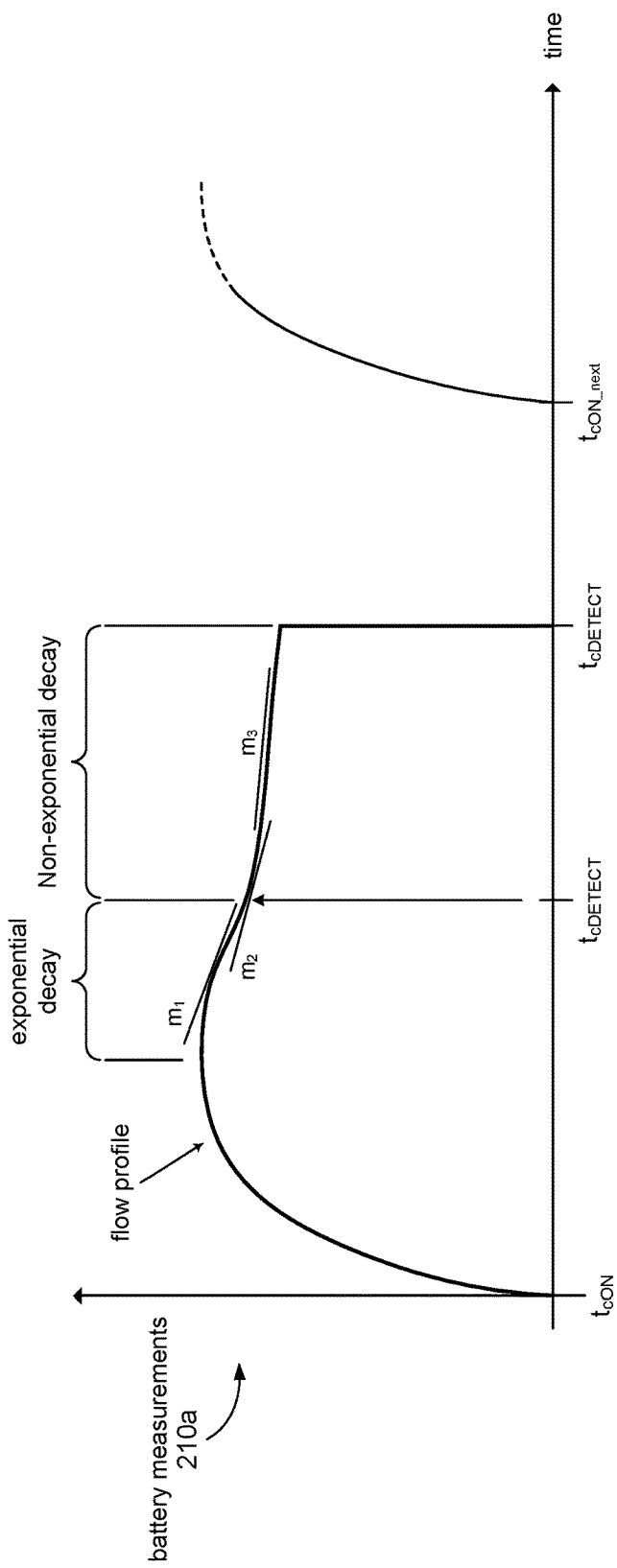
FIG. 8 illustrates details for detecting a change in the current flow through a battery cell, while the battery cell is being charged, in accordance with the present disclosure.

FIG. 8 illustrates an example of detecting a change in the current flow through the battery cell that can be indicative of the onset of charging current saturation. In some embodiments, for example, the flow profile may include an exponential decay portion and a non-exponential decay portion. The non-exponential decay portion can be linear as well as non-linear. The slope of the flow profile can be monitored to detect the transition between the exponential decay portion and the non-exponential decay portion. For example, the slope can be monitored at the onset of the charging pulse at time t$_{cON}$. In some embodiments, the monitoring can begin at some time after t$_{cON}$, since saturation does not happen right away. In some embodiments, the rate of change of the slope (i.e., second derivative of the flow profile) can be used to determine when the change in the current flow through the battery cell has occurred. In other embodiments, the rate of change of the rate of change (i.e., a third derivative) of the charging current can be monitored. In particular, a change in the sign of the third derivative can be detected.

It will be appreciated that other detection techniques can be used. In some embodiments, for example, the change can be associated with switching from exponential current decline into non-exponential current decline. In other embodiments, detection can be based on switching from one exponential decline into another much slower exponential decline, and so on.

Figure 9:
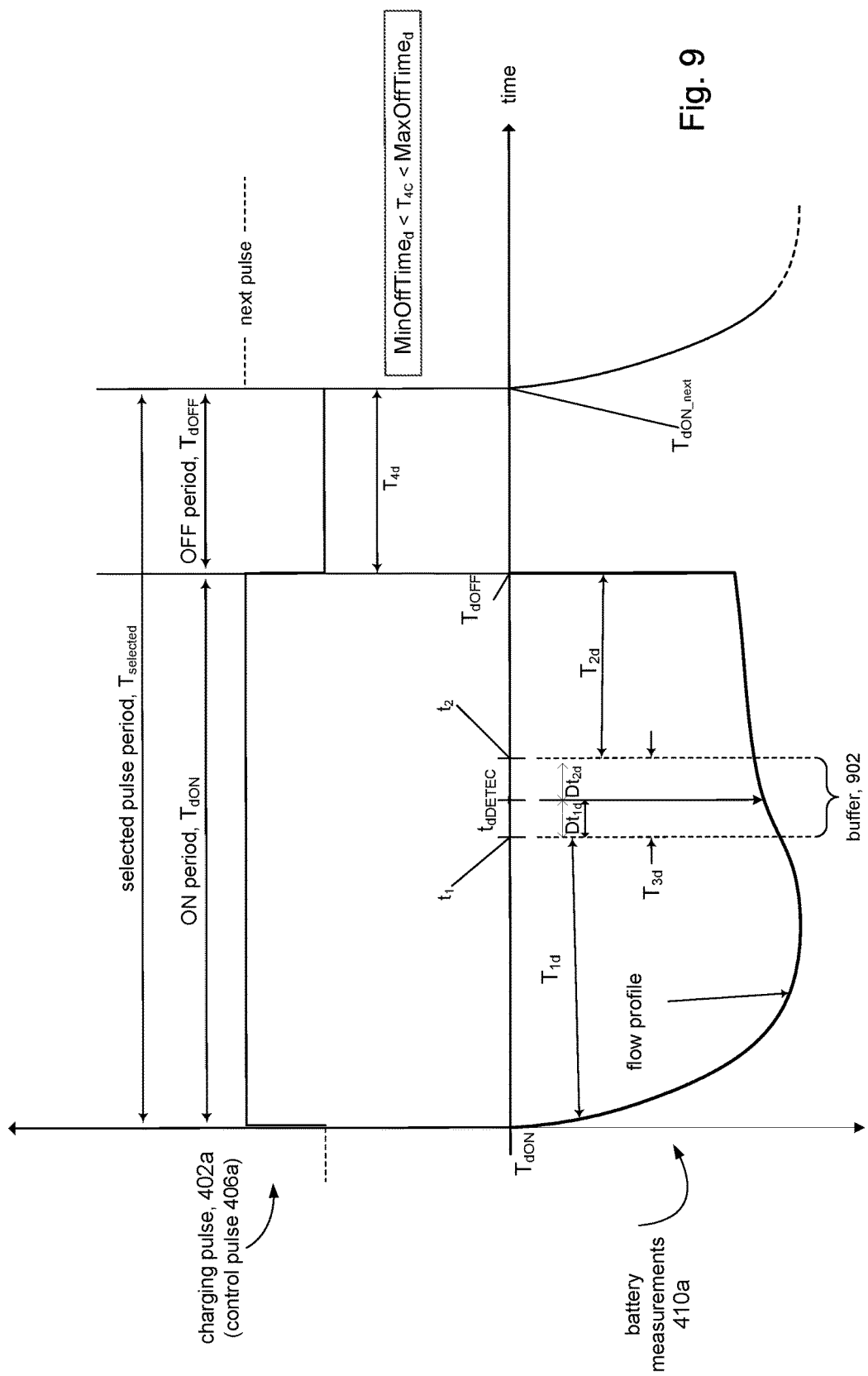
FIG. 9 illustrates details for determining the duty cycle of a discharging pulse in accordance with the present disclosure

Referring now to FIG. 9, the controller 406, in accordance with the present disclosure, can use the battery measurements 410a taken during the time of a discharging pulse 402a to determine its duty cycle for the battery cell 402. Assume for discussion purposes the selected pulse period for discharging pulse 402a is T$_{dselected}$; e.g., selected from a modulated waveform such as shown FIGS. 6A-6C at a time t$_{dON}$. The discharging pulse 402a has an ON period (T$_{dON}$) and an OFF period (T$_{dOFF}$). The duration of T$_{dON}$ and T$_{dOFF}$ of the discharging pulse, for the battery cell 3, can be dynamically determined based on battery measurements 410a made during the ON period of the discharging pulse 402a.

The battery measurements 410a can comprise measurements of discharging current flow through the battery cell 402. Current flow through the battery cell 402, can gradually decrease from the time t$_{on}$ that the discharging pulse 402a is applied and follow the flow profile such as shown in FIG. 9. The flow profile of current through the battery cell 3 depends factors such as battery chemistry, state of charge, temperature, and the like. In a lithium ion battery, for example, during discharging the lithium ions flow from the negative electrode to the positive electrode through the electrolyte. The electrons and lithium ions combine at the positive electrode and intercalate there. During a discharging pulse, the discharge current saturation can occur where additional discharge current through the battery cell 3 for that discharging pulse 402a may not be effective and may even be detrimental (e.g., cause heat buildup, create mechanical stress).

In accordance with the present disclosure, the controller 406 can analyze or otherwise track the current flow to detect the onset discharging charge current saturation by looking for a change in the flow profile. Suppose at time t$_{dDETECT}$ the controller 406 detects such a change in the flow profile. The time of detection t$_{dDETECT}$ can be used to determine the duration T$_{dON}$ of the ON period of the discharging pulse 402a, for example, in order to limit the discharge current from the battery cell 402. A first time period T$_{1d}$ between T$_{dON}$ and t$_{dDETECT}$ can be computed by backing off a margin of time Δt$_{1d}$ from t$_{dDETECT}$, for example, by computing T$_{1d}$=t$_{dDETECT}$−Δt$_{1d}$. A buffer 902 (buffer period) comprising the margin of time Δt$_{1d}$ and Δt$_{2d}$ can be provide around the detection time t$_{dDETECT}$ to account for uncertainty in the detection of the onset of discharge saturation. The first period T$_{1d}$ can be the period between time t$_{dON}$ and time t$_{1d}$.

A second time period T$_{2d}$ can be computed based on keeping the second time period within a predetermined range. During the second time period T$_{2d}$, charge saturation can be a dominant factor during the charging pulse. In some embodiments, the second time period T$_{2d}$ can be determined in order to maintain a certain ratio R between T$_{1d}$ and T$_{2d}$.

For example, $T_{2d}$ can be computed from the relation: $R=T_{1d}/T_{2d}$, where R can be a predetermined ratio. The ON period $T_{dON}$ can be computed as $T_{dON}=(T_{1d}+T_{2d}+T_{3d})$, where $T_{3d}$ is the width of the buffer 502. By dynamically computing the ON period for each discharging pulse 402a, battery cell discharging can be more efficient, battery damage that inherently arises during discharging (e.g., heat buildup) can be reduced (which can contribute to safety), and battery life can be extended.

In accordance with the present disclosure, the OFF period $T_{dOFF}$ of the discharging pulse 402a can be computed by subtracting the $T_{ON}$ from the selected pulse period $T_{dselected}$. However, if the resulting OFF period is too long, then the battery pack may not provide optimum performance to the load, which is undesirable. Accordingly, in accordance with the present disclosure if the $T_{dOFF}$ exceeds a predetermined maximum time MaxOffTime$_d$, $T_{dOFF}$ can be set to MaxOffTime$_d$. Hence, the OFF period $T_{dOFF}$ of the discharging pulse can be computed by selecting the lesser of: (i) a maximum period of time MaxOffTime$_d$, and (ii) the difference between the pulse period and the ON period $T_{dON}$ of the discharging pulse for the battery cell. As a consequence, the actual pulse period of the discharging pulse 402a will be different from the selected pulse period $T_{dselected}$.

If, on the other hand, the resulting OFF period is too short, then there may not be enough recovery time for various chemical reactions in the battery cell 402 to run their course before the onset of the next discharging pulse; more time may be needed. Accordingly, in accordance with the present disclosure, if the $T_{dOFF}$ becomes less than a predetermined minimum time MinOffTime$_d$, $T_{OFF}$ can be set to MinOffTime$_d$ to allow time for the chemical reactions to take place before initiating the next discharging pulse. Hence, the OFF period $T_{dOFF}$ of the discharging pulse can be computed by selecting the greater of: (i) a minimum period of time, and (ii) the difference between the pulse period and the ON period $T_{dON}$ of the discharging pulse for the battery cell. As a consequence, the actual pulse period of the discharging pulse 402a will be different from the selected pulse period $T_{dselected}$.

The amplitude of the discharging current $I_d$ (FIG. 4) of the discharging pulse can vary from one discharging pulse to the next, during the discharging process. The inventors of the present disclosure have noted that the OFF period of one discharging pulse can affect the discharging current amplitude. Accordingly, in some embodiments, rather than basing the OFF period on the selected pulse period $T_{dselected}$, the OFF period can be varied between MinOffTime$_d$ and MaxOffTime$_d$ in response to the amplitude of the discharging current $I_d$.

The battery impedance can change dynamically from one discharging pulse to another. For a given discharging pulse, the battery impedance can be at some initial value at the beginning of the discharging pulse and at some higher value at the end of the discharging pulse. The impedance change during the pulse period can be non-linear in time. The lowest and highest values of the battery impedance during a given discharging pulse can vary during the discharging process. These impedance changes can be predicted based on impedance values previously recorded during other charges of the battery or based on a mathematical model of the battery.

Figure 10:
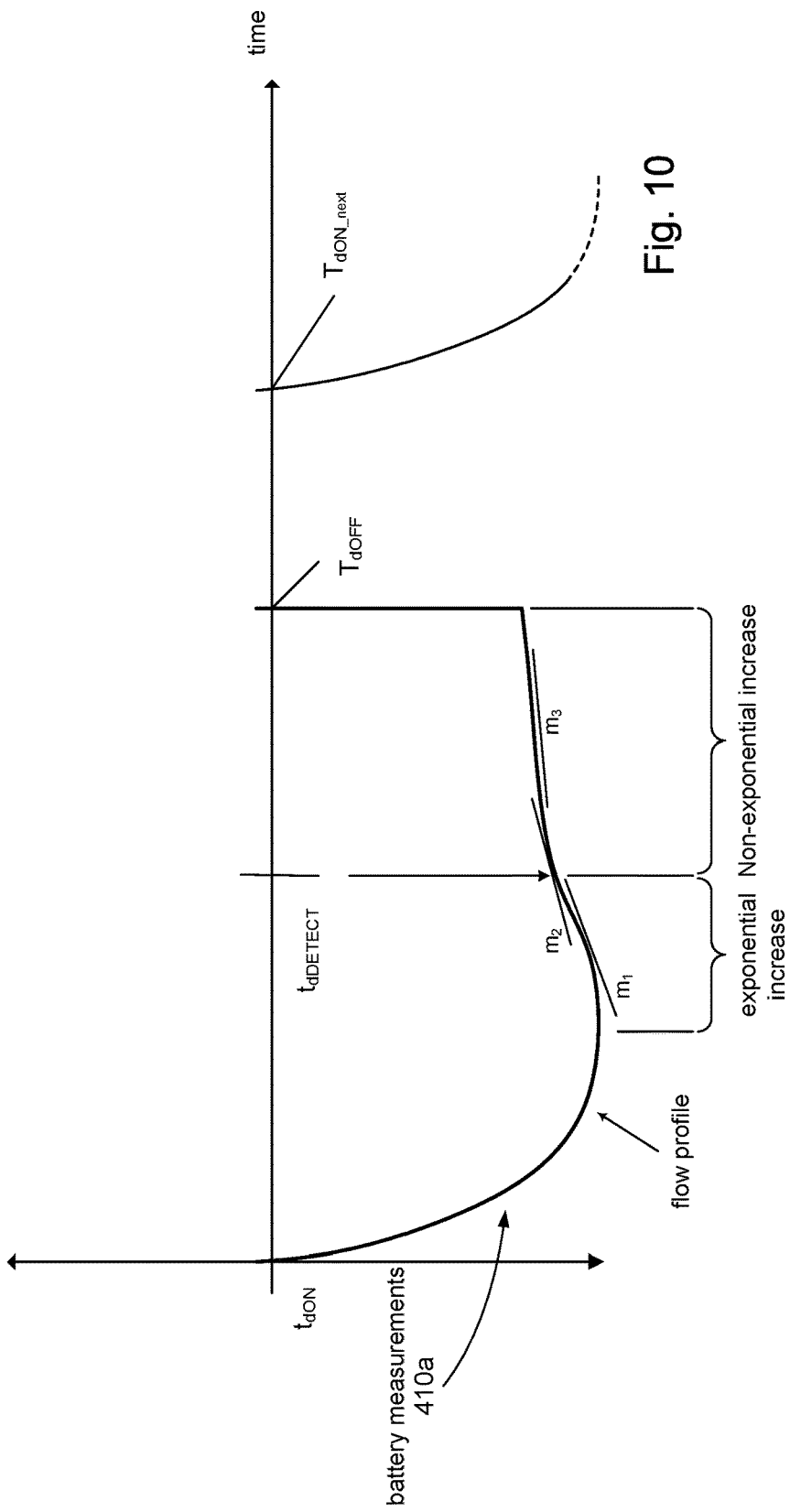
FIG. 10 illustrates details for detecting a change in the current flow through a battery cell, while the battery cell is being discharged, in accordance with the present disclosure.

FIG. 10 illustrates an example of detecting a change in the discharging current flow through the battery cell 402 that can be indicative of the onset of discharge current saturation in some embodiments, for example, the flow profile may include an exponential increase portion and a non-exponential increase portion. The non-exponential increase portion can be linear as well as non-linear. The slope of the flow profile can be monitored to detect the transition between the exponential increase portion and the non-exponential increase portion. For example, the slope can be monitored at the onset of the discharging pulse at time $t_{dON}$. In some embodiments, the monitoring can begin at some time after $t_{dON}$, since saturation does not happen right away. In some embodiments, the rate of change of the slope (i.e., second derivative of the flow profile) can be used to determine when the change in the discharging current flow through the battery has occurred. In other embodiments, the rate of change of the rate of change (i.e., a third derivative) of the discharging current can be monitored. In particular, a change in the sign of the third derivative can be detected.

It will be appreciated that other detection techniques can be used. In some embodiments, for example, the change can be associated with switching from exponential current decline into non-exponential current increase. In other embodiments, detection can be based on switching from one exponential increase into another much slower exponential increase, and so on.

Figure 11:
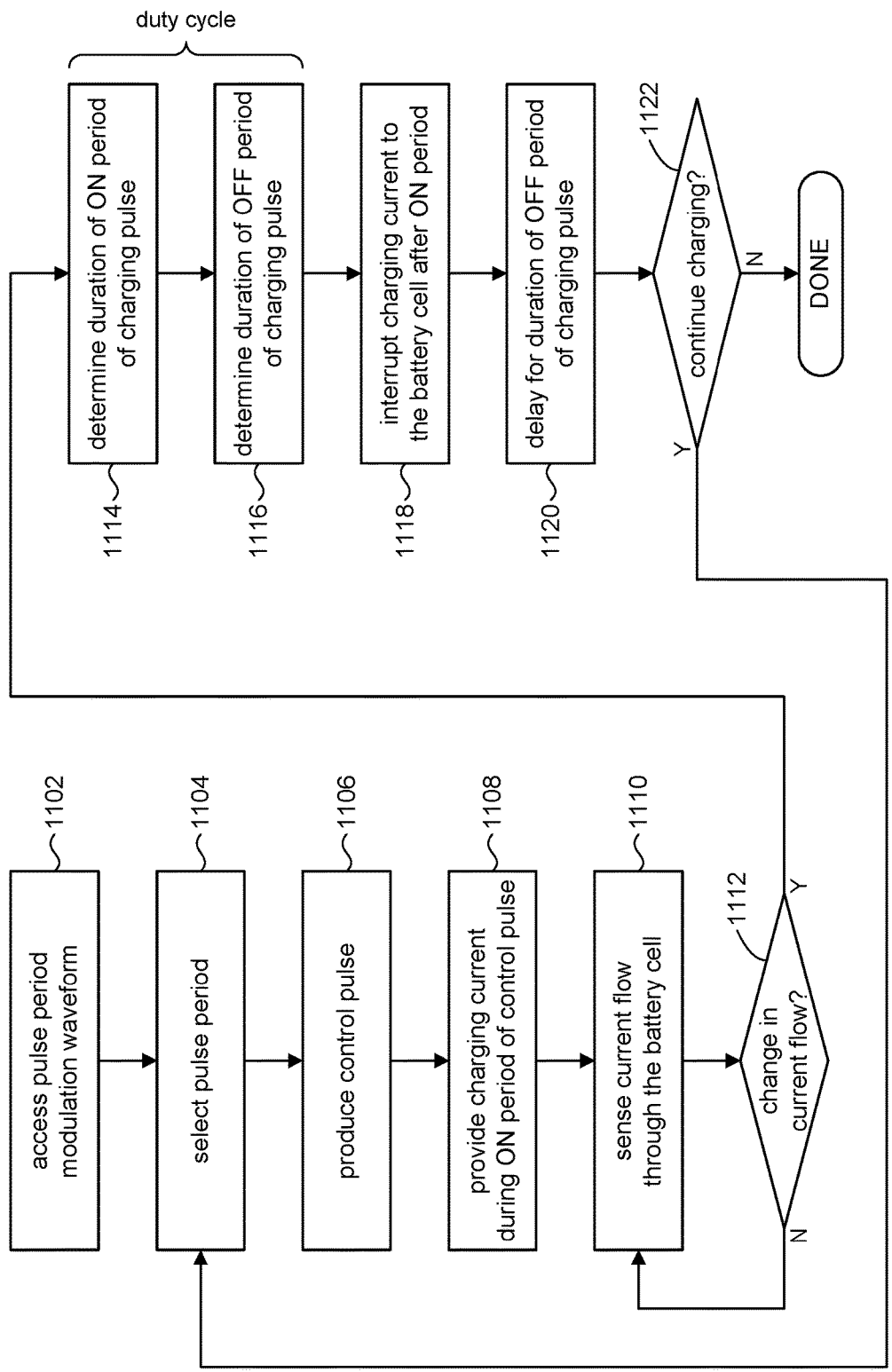
FIG. 11 illustrates a process of pulse charging a battery cell in accordance with the present disclosure.

Referring to FIG. 11, the discussion will now turn to a high level description of processing in the controller 206 for generating charging pulses 202a using pulse modulation in accordance with the present disclosure. In some embodiments, for example, the controller 206 may include computer executable program code or equivalent firmware (e.g., field programmable gate array, FPGA), which when executed cause the controller 206 to perform the processing in accordance with FIG. 11. The flow of operations performed by the controller 206 is not necessarily limited to the order of operations shown.

At block 1102, the controller 206 can access a pulse period modulation waveform (e.g., 300, FIG. 3). In some embodiments, the modulation waveform can comprise a set of pre-computed data points stored in a lookup table. In other embodiments, the controller 206 can compute the pulse periods on the fly.

At block 1104, the controller 206 can select a pulse period (for control pulses 206a and for charging pulses 202a) as a function of time using the modulation waveform. The controller 206 can include a counter to provide a time base.

At block 1106, the controller 206 can output a control pulse 206a to turn ON the switch 212, thus providing charging current to the battery cell 202 (block 1108).

At block 1110, the controller 206 can sense current flow through the battery cell 202. The controller 206 can analyze the battery measurements 210a to detect a change in current flow through the battery cell 202, for example, that indicates the onset of charge current saturation in the battery cell 202.

At block 1112, the controller 206 continue to sense current flow through the battery cell 202 if a change in the flow profile has not been detected. Otherwise, processing can continue to block 1114.

At block 1114, the controller 206 can determine the duration of the ON period $T_{cON}$ of the charging pulse as explained above, using the selected pulse period (block 1104), thus establishing a duty cycle of the charging pulse.

At block 1116, the controller 206 can determine the OFF period $T_{cOFF}$ of the charging pulse. If the ON period for the charging pulse is too short, that can result in too long of an OFF period; in which case, the $T_{cOFF}$ can be set to MaxOffTime$_c$. Conversely, if the ON period for the charging pulse is too long, that can result in too short of an OFF period; in which case, the $T_{OFF}$ can be set to MinOffTime$_c$. Otherwise, $T_{cOFF}$ can be set so that the actual pulse period of the charging pulse is equal to the selected pulse period.

Alternatively, $T_{cOFF}$ can be set to any value between MinOffTime$_c$ and MaxOffTime$_c$ in response to the amplitude of the charging current, as discussed above.

At block 1118, the controller 206 can turn OFF the switching element 212 at the end of the ON period determined at block 1114 to interrupt the flow of charging current from the charging device 204 to the battery cell 202.

At block 1120, the controller 206 can delay for a period of time equal to $T_{cOFF}$ before initiating the next charging pulse. During this delay period, the interruption of charging current from the charging device 204 to the battery cell 202 can be a complete interruption if the switching element 212 is fully OFF (i.e., no flow of charging current to the battery). In some embodiments, during this delay period, some flow of current from the charging device 204 can be provided to the battery cell 202, for example, by partially turning OFF the switching element 212 or controlling the charging device 204 to provide a small amount of trickle current to the battery cell 202. In other embodiments, the charging device 204 can be controlled to create a reverse flow of current from the battery cell 202; e.g., a discharge current.

At block 1122, the controller 206 can determine whether to continue charging the battery cell 202 before initiating the next charging pulse. In some embodiments, for example, a battery management system (BMS, not shown) can make that determination and signal the controller 206 whether to continue charging or not. If charging continues, then processing can return to block 1104 to select the next pulse period.

Figure 12:
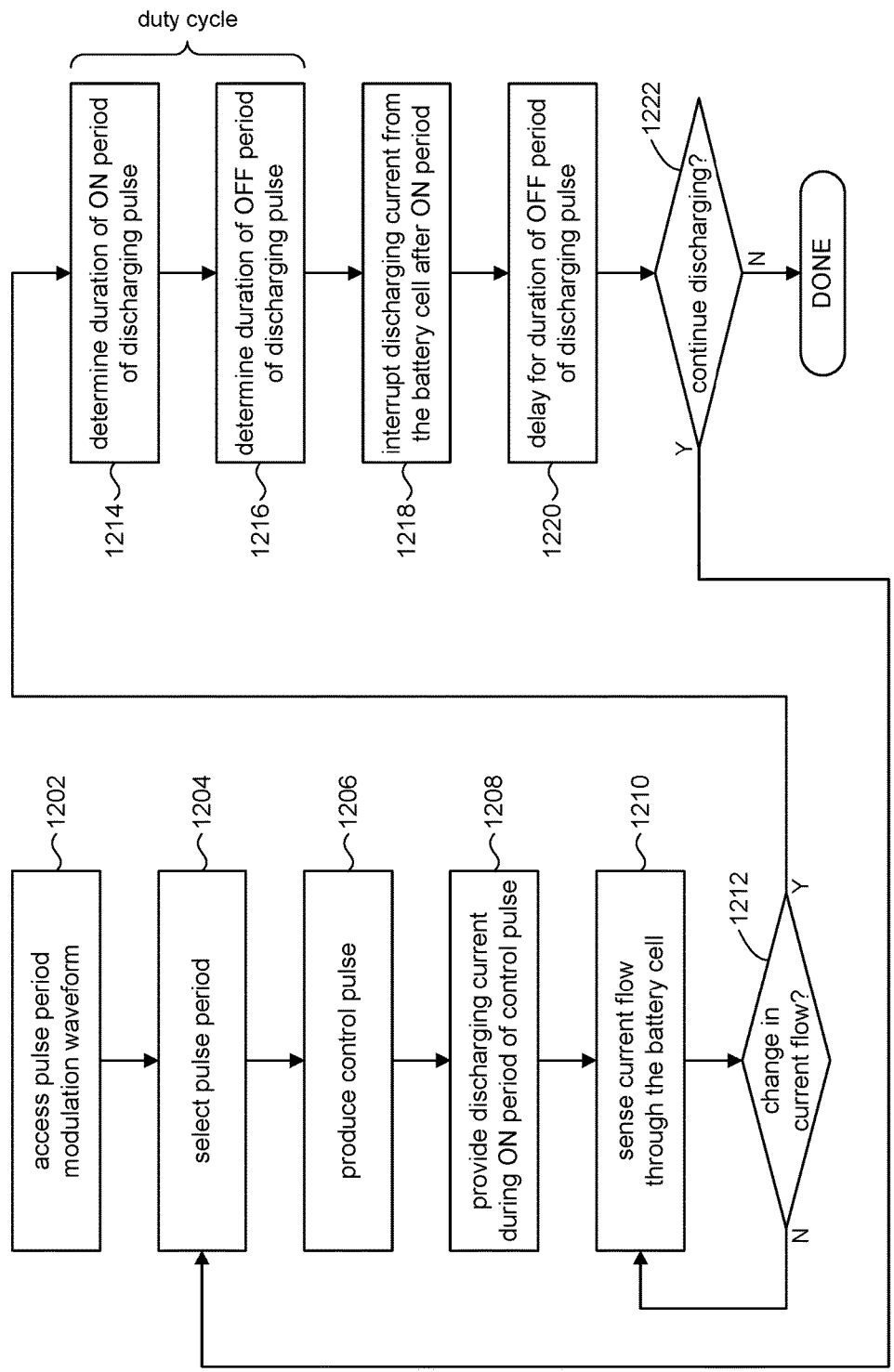
FIG. 12 illustrates a process of pulse discharging a battery cell in accordance with the present disclosure.

Referring to FIG. 12, the discussion will now turn to a high level description of processing in the controller 406 for generating discharging pulses 402a using pulse modulation in accordance with the present disclosure. In some embodiments, for example, the controller 406 may include computer executable program code or equivalent firmware (e.g., field programmable gate array, FPGA), which when executed cause the controller 406 to perform the processing in accordance with FIG. 12. The flow of operations performed by the controller 406 is for each of the battery cells and not necessarily limited to the order of operations shown.

At block 1202, the controller 406 can access a pulse period modulation waveform (e.g., 500, FIG. 5). In some embodiments, the modulation waveform can comprise a set of pre-computed data points stored in a lookup table. In other embodiments, the controller 406 can compute the pulse periods on the fly.

At block 1204, the controller 406 can select a pulse period (for control pulses 406a and for discharging pulses 402a) as a function of time using the modulation waveform. The controller 406 can include a counter to provide a time base.

At block 1206, the controller 406 can output a control pulse 406a to turn ON the switch 412, thus obtaining discharging current from the battery cell 402 (block 1208) for the load 404 at a beginning of an ON period of the control pulse 406a.

At block 1210, the controller 406 can sense current flow (discharging current) through the battery cell 402. The controller 406 can analyze the battery measurements 410a to detect a change in current flow (discharging current) through the battery cell 402, for example, that indicates the onset of charge current saturation in the battery cell 402.

At block 1212, the controller 406 continue to sense current flow through the battery cell 402 if a change in the flow profile has not been detected. Otherwise, processing can continue to block 1214.

At block 1214, the controller 406 can determine the duration of the ON period $T_{dON}$ of the discharging pulse as explained above, using the selected pulse period (block 1204), thus establishing a duty cycle of the discharging pulse.

At block 1216, the controller 406 can determine the OFF period $T_{dOFF}$ of the discharging pulse. If the ON period for the discharging pulse is too short, that can result in too long of an OFF period; in which case, the $T_{dOFF}$ can be set to MaxOffTime$_d$. Conversely, if the ON period for the discharging pulse is too long, that can result in too short of an OFF period; in which case, the $T_{OFF}$ can be set to MinOffTime$_d$. Otherwise, $T_{dOFF}$ can be set so that the actual pulse period of the discharging pulse is equal to the selected pulse period. Alternatively, $T_{dOFF}$ can be set to any value between MinOffTime$_d$ and MaxOffTime$_d$ in response to the amplitude of the discharging current, as discussed above.

At block 1218, the controller 406 can turn OFF the switching element 412 at the end of the ON period determined at block 1414 to interrupt the flow of discharging current from the battery cell 402 to the load 404.

At block 1220, the controller 406 can delay for a period of time equal to $T_{dOFF}$ before initiating the next discharging pulse. During this delay period, the interruption of discharging current from the battery cell 402 to the load 404 can be a complete interruption if the switching element 412 is fully OFF (i.e., no flow of discharging current from the battery cell). In some embodiments, during this delay period, some flow of current from the battery cell 402, can be provided to the load 404, for example, by partially turning OFF the switching element 412. In some embodiments, a small amount of trickle current can be provided to the battery cell 3. In other embodiments, the charging device 26 can be controlled to create a reverse flow of current from the battery cell 3; e.g., a charging current. In other embodiments, the trickle current can be provided by another battery cell.

At block 1222, the controller 406 can determine whether to continue discharging the battery cell 402 before initiating the next discharging pulse. In some embodiments, for example, a battery management system (BMS, not shown) can make that determination and signal the controller 406 whether to continue discharging or not. If discharging continues, then processing can return to block 1204 to select the next pulse period.

Figure 13:
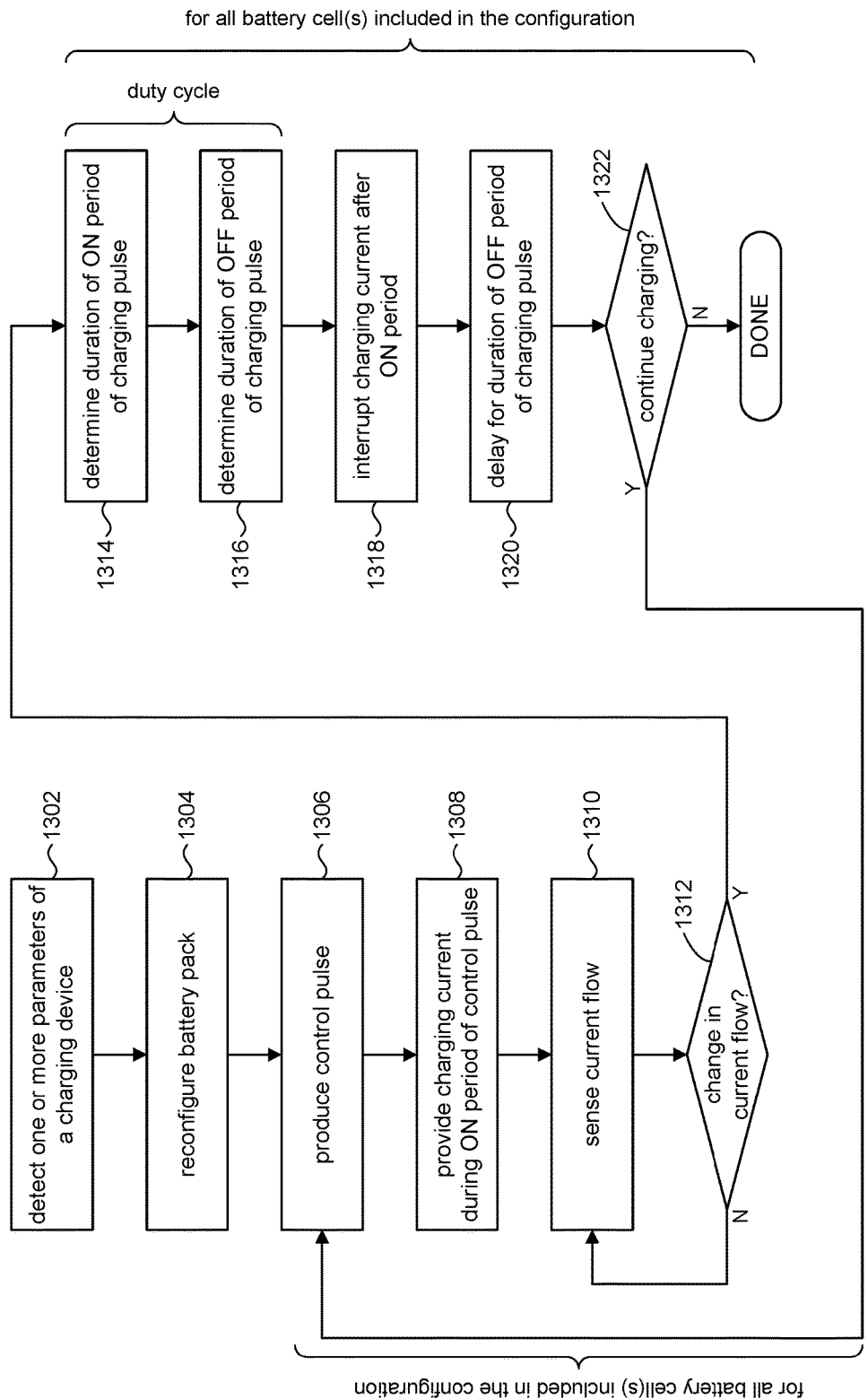
FIG. 13 illustrates a process of pulse charging a reconfigurable battery pack in accordance with the present disclosure.

Referring to FIG. 13, the discussion will now turn to a high level description of processing in the controller 2 for charging the battery pack 1 using pulse modulation in accordance with the present disclosure. In some embodiments, for example, the controller 2 may include computer executable program code or equivalent firmware (e.g., field programmable gate array, FPGA), which when executed cause the controller 2 to perform the processing in accordance with FIG. 13. The flow of operations performed by the controller 2 is not necessarily limited to the order of operations shown.

At block 1302, the controller 2 may detect one or more parameters of a charging device 26. As discussed previously, the one or more parameters may include, but not limited to, current and voltage specifications of the charging device 26. In some embodiments, the controller 2 may receive information about the one or more parameters of the charging device 26 from the charging device 26 itself through a one-way or two-way communication link between the controller 2 and the charging device 26. In some embodiments, the controller 2 may determine the one or more parameters of the charging device 26, when the charging device 26 connects to the battery pack 1 for charging the battery pack 1. In some embodiments, the detection of one or more parameters may be performed periodically by the controller 2, which enables reconfiguration of the battery pack 1 in near real-time.

At block 1304, the controller 2 may reconfigure battery pack 1 based on the detected one or more parameters of the charging device 26. The reconfiguration of the battery pack 1 includes selection of one or more battery cells and/or one or more groups of battery cells that are to be charged by the charging device 26, and configuration of states of switching elements 12-20 and bypass switching elements 23-25 associated with the battery cells 3-11 accordingly. For example, the controller 2 may determine which switching elements and/or bypass switching elements to keep in OPEN state and which switching elements and/or bypass switching elements to keep in CLOSED to charge the one or more battery cells selected for charging by the controller 2. Accordingly, the controller 2 may configure the states of the switching elements 12-20 and the bypass switching elements 23-25 to reconfigure the battery pack 1.

For each of the one or more battery cells selected for charging in the reconfigured battery pack 1, the controller performs the process of modulated pulse charging as described in the blocks 1306-1322. The blocks 1306-1322 are analogous to blocks 1106-1122 that describe the process of modulated pulse charging for a single battery cell.

At block 1306, the controller 2 can output respective control pulses to turn ON the respective switching elements associated (connected in series) with the one or more battery cells, thus providing charging current to the one or more battery cells (block 1308) during ON period of the respective control pulses.

At block 1310, the controller 2 can sense current flow (charging current) through the one or more battery cells. The controller 2 can analyze the respective battery measurements, which correspond to the one or more battery cells, to detect a change in current flow through the one or more battery cells, for example, that indicates the onset of charging current saturation in the one or more battery cells.

At block 1312, the controller 2 continues to sense current flow through the one or more battery cells, while providing the charging current to the one or more battery cells, if a change in the flow profile has not been detected. Otherwise, processing can continue to block 1314.

At block 1314, based on the change in the charging current flow, for the one or more battery cells, the controller 2 can determine the durations of the ON periods $T_{cON}$ of the respective charging pulses as explained above, using pulse period of the respective charging pulses, thus establishing duty cycle of the respective charging pulses.

At block 1316, the controller 206 can determine the durations of the OFF periods $T_{cOFF}$ of the respective charging pulses. If the ON period for the charging pulse is too short, that can result in too long of an OFF period; in which case, the $T_{cOFF}$ can be set to $MaxOffTime_c$. Conversely, if the ON period for the charging pulse is too long, that can result in too short of an OFF period; in which case, the $T_{cOFF}$ can be set to $MinOffTime_c$. Otherwise, $T_{cOFF}$ can be set so that the actual pulse period of the charging pulse is equal to the selected pulse period. Alternatively, $T_{cOFF}$ can be set to any value between $MinOffTime_c$ and $MaxOffTime_c$ in response to the amplitude of the charging current, as discussed above. The duration of the OFF period of the charging pulse is selected such that there is overlap with at least a portion of the duration of the ON period of the respective charging pulse(s) for one or more other battery cells connected in parallel with the battery cell, if the bypass switching element associated with the group of battery cells connected in parallel is in OPEN state during the duration of the OFF period of the respective charging pulse for the battery cell. The overlap of the ON and OFF duration of charging pulses for different battery cells is to complete a circuit between terminals 21 and 22 of the battery pack 1. However, if the duration of the OFF period of the respective charging pulse for the battery cell does not overlap with the duration of the ON period of the respective charging pulses for parallel battery cell(s), the controller 2 may keep bypass switching element associated with the battery cell to be in CLOSED state for the duration of the OFF period to complete the circuit between the terminals 21 and 22 of the battery pack 1.

At block 1318, the controller 2 can turn OFF the respective associated switching elements at the end of the respective ON periods determined at block 1314 to interrupt the flow of charging current from the charging device 26 to the one or more battery cells.

At block 1320, the controller 2 can delay for periods of time equal to respective $T_{cOFF}$ before initiating the next respective charging pulses. During this delay period, the interruption of charging current from the charging device 26 to the one or more battery cells can be a complete interruption if the respective associated switching elements are fully OFF (i.e., no flow of charging current to the one or more battery cells). In some embodiments, during this delay period, some flow of current from the charging device 26 can be provided to the one or more battery cells, for example, by partially turning OFF the respective associated switching elements or controlling the charging device 26 to provide a small amount of trickle current to the one or more battery cells. In other embodiments, the charging device 26 can be controlled to create a reverse flow of current from the one or more battery cells; e.g., a discharging current.

At block 1322, the controller 2 can determine whether to continue charging the one or battery cells before initiating the respective next charging pulses. In some embodiments, for example, a battery management system (BMS, not shown) can make that determination and signal the controller 2 whether to continue charging or not. If charging continues, then processing can return to block 1306 to output the respective next control pulses.

Figure 14:
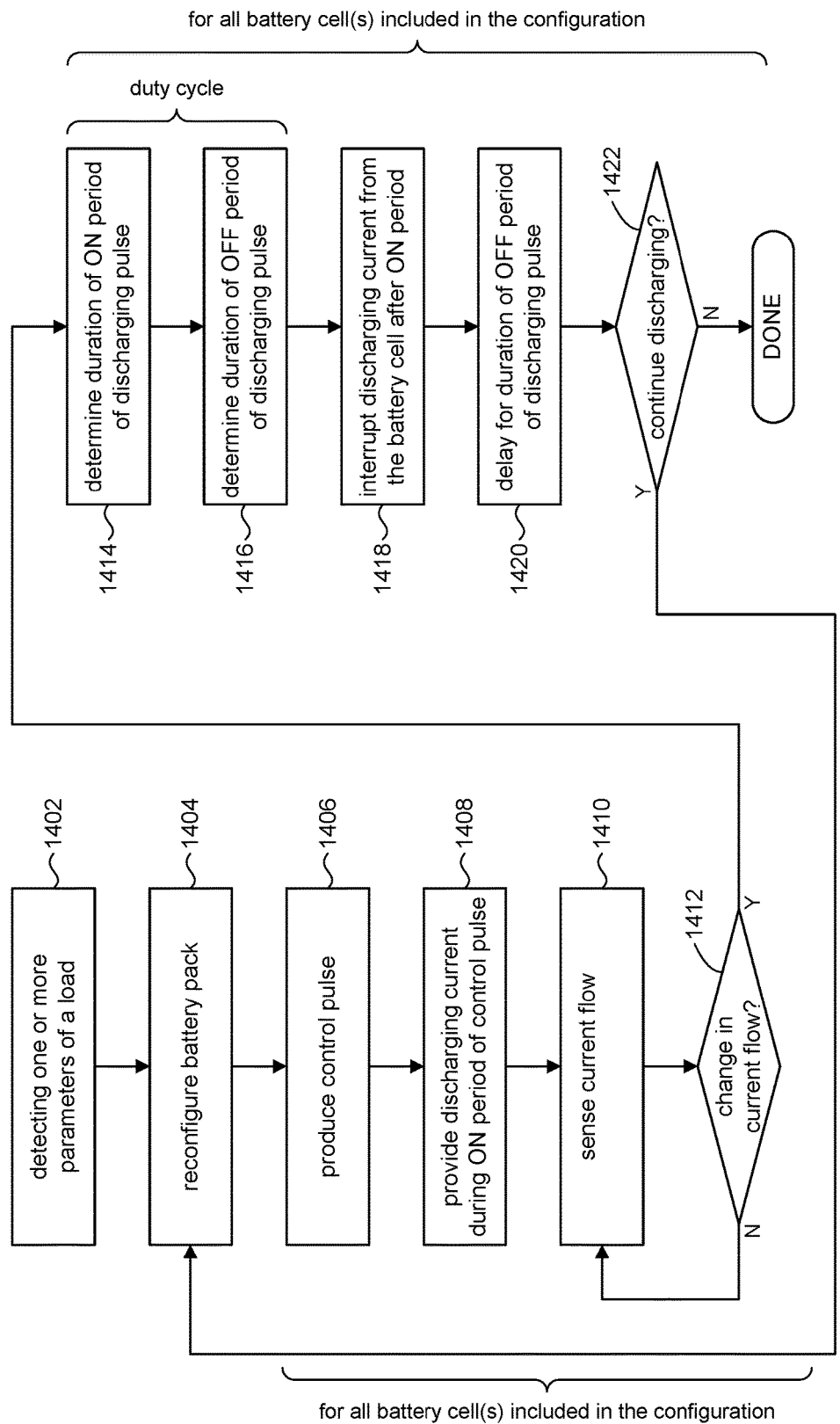
FIG. 14 illustrates a process of pulse discharging a reconfigurable battery pack in accordance with the present disclosure.

Referring to FIG. 14, the discussion will now turn to a high level description of processing in the controller 2 for discharging the battery pack 1 using pulse modulation in accordance with the present disclosure. In some embodiments, for example, the controller 2 may include computer executable program code or equivalent firmware (e.g., field programmable gate array, FPGA), which when executed cause the controller 2 to perform the processing in accordance with FIG. 14. The flow of operations performed by the controller 2 is not necessarily limited to the order of operations shown.

At block 1402, the controller 2 may detect one or more parameters of load 27. As discussed previously, the one or more parameters may include, but not limited to, current and voltage requirements of the load 27. In some embodiments, the controller 2 may receive information about the one or more parameters of the load 27 from the load 27 itself through a one-way or two-way communication link between the controller 2 and the load 27. In some embodiments, the controller 2 may determine the one or more parameters of the load 27, when the load connects to the battery pack 1 for receiving current from the battery pack 1. In some embodiments, the detection of one or more parameters may be performed periodically by the controller 2, which enables reconfiguration of the battery pack 1 in near real-time.

At block 1404, the controller 2 may reconfigure battery pack 1 based on the detected one or more parameters of the load 27. The reconfiguration of the battery pack 1 includes selection of one or more battery cells and/or one or more groups of battery cells that are to be discharged through the load 27, and configuration of states of switching elements 12-20 and bypass switching elements 23-25 associated with the battery cells 3-11 accordingly. For example, the controller 2 may determine which switching elements and/or bypass switching elements to keep in OPEN state and which switching elements and/or bypass switching elements to keep in CLOSED to discharge the one or more battery cells selected for discharging. Accordingly, the controller 2 may configure the states of the switching elements 12-20 and the bypass switching elements 23-25 to reconfigure the battery pack 1.

For each of the one or more battery cells selected for discharging in the reconfigured battery pack 1, the controller performs the process of modulated pulse discharging as described in the blocks 1406-1422. The blocks 1406-1422 are analogous to blocks 1206-1222 that describe the process of modulated pulse discharging for a single battery cell.

At block 1406, the controller 2 can output respective control pulses to turn ON the respective switching elements associated (connected in series) with the one or more battery cells, thus providing discharging current from the one or more battery cells (block 1408) to the load.

At block 1410, the controller 2 can sense current flow (discharging current) through the one or more battery cells. The controller 2 can analyze the respective battery measurements, which correspond to the one or more battery cells, to detect a change in current flow through the one or more battery cells, for example, that indicates the onset of discharging current saturation in the one or more battery cells.

At block 1412, the controller 2 continues to sense current flow through the one or more battery cells, while providing the discharging current from the one or more battery cells, if a change in the flow profile has not been detected. Otherwise, processing can continue to block 1414.

At block 1414, based on the change in the discharging current flow, for the one or more battery cells, the controller 2 can determine the durations of the ON periods $T_{ON}$ of the respective discharging pulses as explained above, using pulse period of the respective discharging pulses, thus establishing duty cycle of the respective discharging pulses.

At block 1416, the controller 206 can determine the durations of the OFF periods $T_{dOFF}$ of the respective discharging pulses. If the ON period for the discharging pulse is too short, that can result in too long of an OFF period; in which case, the $T_{dOFF}$ can be set to MaxOffTime$_d$. Conversely, if the ON period for the discharging pulse is too long, that can result in too short of an OFF period; in which case, the $T_{dOFF}$ can be set to MinOffTime$_d$. Otherwise, $T_{dOFF}$ can be set so that the actual pulse period of the discharging pulse is equal to the selected pulse period. Alternatively, $T_{dOFF}$ can be set to any value between MinOffTime$_d$ and MaxOffTime$_d$ in response to the amplitude of the discharging current, as discussed above. The duration of the OFF period of the discharging pulse is selected such that there is overlap with at least a portion of the duration of the ON period of the respective discharging pulse(s) for one or more other battery cells connected in parallel with the battery cell, if the bypass switching element associated with the group of battery cells connected in parallel is in OPEN state during the duration of the OFF period of the discharging pulse for the battery cell. The overlap of the ON and OFF duration of discharging pulses for different battery cells is to complete a circuit between terminals 21 and 22 of the battery pack 1. However, if the duration of the OFF period of the respective discharging pulse for the battery cell does not overlap with the duration of the ON period of the discharging pulses for parallel battery cell(s), the controller 2 may keep bypass switching element associated with the battery cell to be in CLOSED state for the duration of the OFF period to complete the circuit between the terminals 21 and 22 of the battery pack 1.

At block 1418, the controller 2 can turn OFF the respective associated switching elements at the end of the respective ON periods determined at block 1414 to interrupt the flow of discharging current from the one or more battery cells to the load 27.

At block 1420, the controller 2 can delay for periods of time equal to respective $T_{dOFF}$ before initiating the next respective discharging pulses. During this delay period, the interruption of discharging current from the one or more battery cells to the load 27 can be a complete interruption if the respective associated switching elements are fully OFF (i.e., no flow of discharging current from the one or more battery cells). In some embodiments, a small amount of trickle current can be provided to the one or more battery cells. In some embodiments, the charging device 26 can be controlled to create a reverse flow of current to the one or more battery cells e.g., a charging current. In other embodiments, the trickle current can be provided by another battery cell.

At block 1422, the controller 2 can determine whether to continue discharging the battery cell before initiating the respective next discharging pulses. In some embodiments, for example, a battery management system (BMS, not shown) can make that determination and signal the controller 2 whether to continue discharging or not. If discharging continues, then processing can return to block 1406 to output the respective next control pulses.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

Figure 15:
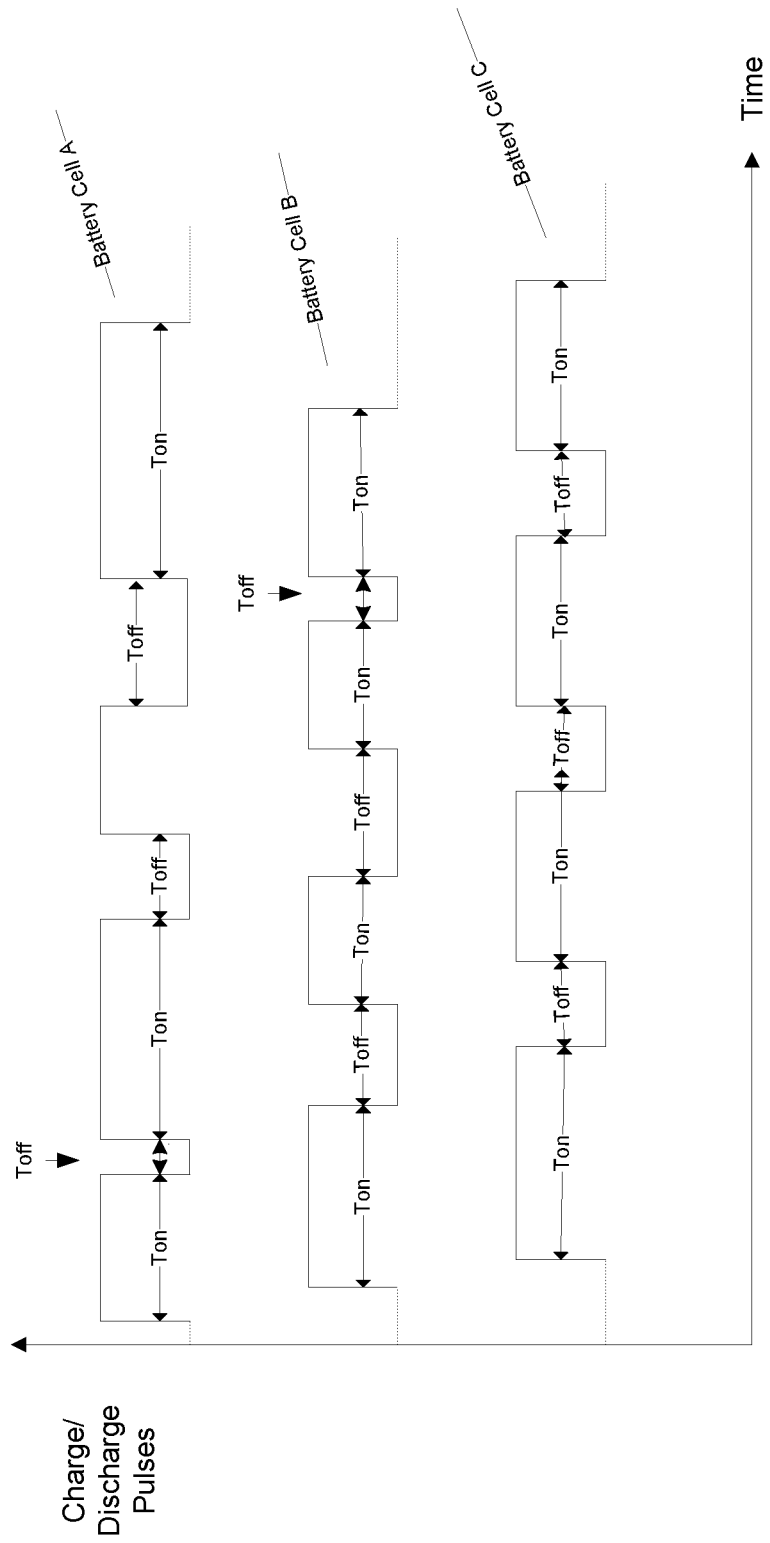
FIG. 15 illustrates examples of pulse sequences for pulse charging and pulse discharging in accordance with the present disclosure.

FIG. 15 illustrates examples of pulse sequences for pulse charging and pulse discharging in accordance with the present disclosure. The pulse sequences depicted in FIG. 15 are for battery cell A, battery cell B, and battery cell C, which are connected in parallel. Battery cell A, Battery cell B, and Battery cell C can be any of battery cells 3-11 of FIG. 1. As can be seen in FIG. 15, the duration of OFF period of any pulse in any pulse sequence for any of battery cell is overlapped by at least a portion of ON period(s) in pulse sequence(s) for other battery cells. In accordance with the current disclosure, the controller 2 ensures such overlapping to enable a continuous flow of charging current from the charging device 26 to the battery pack 1 while the battery pack 1 is being charged, and to enable a continuous flow of discharging current from the battery pack 1 to the load 27 while the battery pack 1 is being discharged.

FIGS. 16A and 16B illustrate examples of overall flow profiles of charging current and discharging current in a battery pack respectively. The charging current flow profile depicted in FIG. 16A depicts is an amalgamation of charging current flow profiles of various battery cells (in a battery pack), which overlap to form ripples that represent actual charging current flow profile for the battery pack. Similarly FIG. 16B depicts amalgamation of discharging current flow profiles of various battery cells (in a battery pack), which overlap to form ripples that represent actual discharging current flow profile for the battery pack.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less all features of a single disclosed embodiment. Thus the following claims are hereby incorporated into the Detailed Description, with each claim standing on its own as a separately claimed subject matter.

What is claimed is:

1. A method to charge a reconfigurable battery pack that includes a plurality of battery cells, the method comprising:
   detecting one or more parameters of a charging device;
   reconfiguring, based on the detected one or more parameters, the reconfigurable battery pack, wherein reconfiguring the reconfigurable battery pack includes selecting one or more battery cells to be charged;
   providing, from the charging device to the one or more battery cells, charging current during ON periods of respective control pulses for the one or more battery cells;
   detecting, while providing the charging current to the one or more battery cells, change in charging current flow through the one or more battery cells;
   determining, based on the change in the charging current flow and pulse periods of respective charging pulses, for the one or more battery cells, durations of ON periods and durations of OFF periods of the respective charging pulses,
   wherein for each of the one or more battery cells, the duration of the OFF period of the respective charging pulse overlaps with at least a portion of the duration of the ON period of the respective charging pulses for one or more other battery cells connected in parallel with the battery cell;
   interrupting, at end of the respective ON periods, for the one or more battery cells, the charging current flow; and
   delaying, for periods of time equal to the durations of the OFF periods of the respective charging pulses, for the one or more battery cells, initiation of next respective charging pulses.

2. The method of claim 1, further comprising:
   determining a configuration schedule based on the detected one or more parameters,
   wherein selecting the one or more battery cells includes selecting the one or more battery cells for a time period that is based on the determined configuration schedule.

3. The method of claim 1, further comprising:
   exchanging one or more short pulses between at least some of the one or more battery cells, when the at least some of the one or more battery cells are idle.

4. The method of claim 1, wherein selecting the one or more battery cells includes selecting the one or more battery cells from the plurality of battery cells based on one or more of: age of the one or more battery cells, current state of the one or more battery cells, and health of the one or more battery cells.

5. The method of claim 1, wherein determining, for the one or more battery cells, the durations of the OFF periods of the respective charging pulses includes selecting the greater of: (i) a minimum period of time, and (ii) the difference between the respective pulse period and the ON period of the respective charging pulse for the battery cell.

6. The method of claim 1, wherein determining, for the one or more battery cells, the durations of the OFF periods of the respective charging pulses includes selecting the lesser of: (i) a maximum period of time, and (ii) the difference between the respective pulse period and the ON period of the respective charging pulse for the battery cell.

7. The method of claim 1, wherein delaying for the periods of time equal to the durations of the OFF periods, for the one or more battery cells, the initiation of providing the next respective charging pulses includes one of:
provide some of the charging current flow from the charging device to the one or more battery cells, or
creating a flow of the charging current out of the one or more battery cells.

8. A battery system, comprising:
a reconfigurable battery pack comprising a plurality of battery cells arranged in a plurality of groups of battery cells, which are connected in parallel; and
a controller, operatively coupled to the reconfigurable battery pack, configured to:
detect one or more parameters of a charging device;
reconfigure, based on the detected one or more parameters, the reconfigurable battery pack, wherein the reconfiguration of the reconfigurable battery pack includes selection of one or more battery cells to be charged;
provide, from the charging device to the one or more battery cells, charging current during ON periods of respective control pulses for the one or more battery cells;
detect, while the charging current is being provided to the one or more battery cells, change in charging current flow through the one or more battery cells;
determine, based on the change in the charging current flow and pulse periods of respective charging pulses, for the one or more battery cells, durations of ON periods and duration of an OFF periods of the respective charging pulses,
wherein for each of the one or more battery cells, the duration of the OFF period of the respective charging pulse overlaps with at least a portion of the duration of the ON period of the respective charging pulses for one or more other battery cells connected in parallel with the battery cell;
interrupt, at end of the respective ON periods, for the one or more battery cells, the charging current flow; and
delay, for periods of time equal to the durations of the OFF periods, for the one or more battery cells, initiation of next respective charging pulses.

9. The reconfigurable battery system of claim 8, wherein the one or more parameters include one or more of voltage and current values, specified for the charging device.

10. The reconfigurable battery system of claim 8, further comprising:
a plurality of switching elements that are configured to enable flow of current to/from the plurality of battery cells; and
a plurality of bypass switching elements that are configured to enable the flow of current to/from the plurality of groups of battery cells.

11. The reconfigurable battery system of claim 8, further comprising:
a measurement circuit to measure at least the charging current and a discharging current that flow through the plurality of battery cells.

12. A method to discharge a reconfigurable battery pack that includes a plurality of battery cells, the method comprising:
detecting one or more parameters of load;
reconfiguring, based on the detected one or more parameters, the reconfigurable battery pack, wherein reconfiguring the battery pack includes selecting one or more battery cells, of the plurality of battery cells, to be discharged;
providing, from the one or more battery cells to the load, discharging current during ON periods of respective control pulses for the one or more battery cells;
detecting, while providing the discharging current from the one or more battery cells, a change in discharging current flow through the one or more battery cells;
determining, based on the change in the discharging current flow and pulse periods of respective discharging pulses, for the one or more battery cells, durations of ON periods and durations of OFF periods of the respective discharging pulses,
wherein for each of the one or more battery cells, the duration of the OFF period of the respective discharging pulse overlaps with at least a portion of the duration of the ON period of the respective discharging pulses for one or more other battery cells connected in parallel with the battery cell;
interrupting, at end of the respective ON periods, for the one or more battery cells, the discharging current flow; and
delaying, for a periods of time equal to the durations of the OFF periods of the respective discharging pulses, for the one or more battery cells, initiation of next respective discharging pulses.

13. The method of claim 12, wherein selecting the one or more battery cells includes the selecting the plurality of battery cells to be connected to the load in rotation.

14. The method of claim 12, further comprising:
exchanging one or more short pulses between at least some of the one or more battery cells, when the at least some of the one or more battery cells are idle.

15. The method of claim 12, wherein selecting the one or battery cells includes determining a time period for which the one or more battery cells are to be discharged, and wherein the time period is based on age of the one or more battery cells, current state of charge of the one or more battery cells, and health of the one or more battery cells.

16. A battery system, comprising:
a reconfigurable battery pack comprising a plurality of battery cells arranged in a plurality of groups of battery cells, which are connected in parallel; and
a controller, operatively coupled to the reconfigurable battery pack, configured to:
detect one or more parameters of load;
reconfigure, based on the detected one or more parameters, the reconfigurable battery pack, wherein the reconfiguration of the reconfigurable battery pack includes selection of one or more battery cells to be charged;
provide, from the one or more battery cells to the load, discharging current during ON periods of respective control pulses for the one or more battery cells;
detect, while the discharging current is being provided from the one or more battery cells, change in discharging current flow through the one or more battery cells;
determine, based on the change in the discharging current flow and pulse periods of respective discharging pulses, for the one or more battery cells, durations of ON periods and durations of OFF periods of the respective discharging pulses,
wherein for each of the one or more battery cells, the duration of the OFF period of the respective discharging pulse overlaps with at least a portion of the duration of the ON period of the respective discharging pulses for one or more other battery cells connected in parallel with the battery cell;

interrupt, at end of the respective ON periods, for the one or more battery cells, the discharging current flow; and delay, for periods of time equal to the durations of the OFF periods of the respective discharging pulses, for the one or more battery cells, initiation of next respective discharging pulses.

17. The reconfigurable battery system of claim 16, wherein the one or more battery cells selected to be discharged belong to different groups of battery cells.

18. An apparatus, comprising:

a battery cell; and a controller operatively coupled to the battery cell, configured to:

select a pulse period;

(i) provide a discharging pulse to the battery cell, including:

provide discharging current from the battery cell to load at a beginning of an ON period of a control pulse;

analyze measurements that correspond to the battery cell;

detect, based on the analysis, a change in current flow through the battery cell;

determine, based on the change in the current flow, a duration of the ON period of the discharging pulse; and interrupt the discharging current from the battery cell to the load at an end of the ON period of the discharging pulse;

(ii) determine a duration of an OFF period of the discharging pulse, wherein determination includes computation of a difference between the selected pulse period and the ON period of the discharging pulse;

(iii) delay for a duration of the OFF period of the discharging pulse;

(iv) select another pulse period; and repeat (i), (ii), (iii), and (iv) using the pulse period selected in (iv).

19. The apparatus of claim 18, wherein determination of the duration of the OFF period of the discharging pulse further includes selection of the greater of: (1) a minimum period of time; and (2) the difference between the selected pulse period and the ON period of the discharging pulse.

20. The apparatus of claim 18, wherein determination of the duration of the OFF period of the discharging pulse further includes selection of the lesser of: (1) a maximum period of time; and (2) the difference between the selected pulse period and the ON period of the discharging pulse.

21. The apparatus of claim 18, wherein determination of the duration of the ON period of the discharging pulse includes:

computation of a first time period between initiation of the discharging current flow from the battery cell and detection of the change in current flow through the battery cell; and computation of a second time period based on a predetermined ratio between the first time period and the second time period.

22. The apparatus of claim 21, wherein the duration of the ON period of the discharging pulse comprises a sum of the first time period, the second time period, and the duration of a buffer period that spans a detection time of the change in current flow through the battery cell.

23. The apparatus of claim 18, further comprising:

an FET switch to provide the discharging current from the battery cell to the load, and to interrupt the discharging current from the battery cell to the load, wherein the controller is further configured to vary a gate-source voltage of the FET switch to control the current flow from the battery cell.

* * * * *